(12) United States Patent
Dahn et al.

(10) Patent No.: US 7,615,312 B2
(45) Date of Patent: Nov. 10, 2009

(54) SUBSTITUTED PHENOTHIAZINE REDOX SHUTTLES FOR RECHARGEABLE LITHIUM-ION CELL

(75) Inventors: Jeffrey R. Dahn, Hubley (CA); Claudia Buhrmester, Prospect (CA); Richard L. Wang, Halifax (CA); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 856 days.

(21) Appl. No.: 11/130,850

(22) Filed: May 17, 2005

(65) Prior Publication Data
US 2006/0263697 A1    Nov. 23, 2006

(51) Int. Cl.
*H01M 4/58* (2006.01)
(52) U.S. Cl. ............ 429/231.1; 429/221; 429/224; 429/231.95; 429/328; 429/336; 429/330; 429/332; 429/338; 429/342; 429/339; 429/340; 429/50; 29/623.2; 29/623.1
(58) Field of Classification Search .......... 429/328, 429/336, 330, 332, 338, 342, 339, 340, 231.95, 429/231.1, 221, 224, 50; 29/623.2, 623.1
See application file for complete search history.

(56) References Cited

U.S. PATENT DOCUMENTS

| 4,869,977 A * | 9/1989 | Connolly et al. ............ 429/325 |
| 5,858,573 A | 1/1999 | Abraham et al. |
| 5,879,834 A | 3/1999 | Mao |
| 5,976,731 A | 11/1999 | Negoro et al. |
| 6,004,698 A | 12/1999 | Richardson et al. |
| 6,074,777 A | 6/2000 | Reimers et al. |
| 6,203,944 B1 | 3/2001 | Turner et al. |
| 6,905,799 B2 | 6/2005 | Okahara et al. |
| 7,294,436 B2 | 11/2007 | Abe et al. |
| 2001/0004507 A1 | 6/2001 | Gan et al. |
| 2005/0221168 A1 | 10/2005 | Dahn et al. |
| 2008/0050658 A1 | 2/2008 | Abe et al. |

FOREIGN PATENT DOCUMENTS

| EP | 0 825 663 A2 | 2/1998 |
| GB | 1066928 | 4/1967 |
| JP | 05-295058 | 11/1993 |
| JP | 07-302614 | 11/1995 |
| JP | 2001-015156 | 1/2001 |
| JP | 2001-023687 | * 1/2001 |

(Continued)

OTHER PUBLICATIONS

Balakrishnan, P.G., et al., "Safety Mechanisms in Lithium-Ion Batteries," *Journal of Power Sources*, vol. 155, No. 2, Apr. 21, 2006, pp. 401-414.

(Continued)

*Primary Examiner*—Laura S Weiner
(74) *Attorney, Agent, or Firm*—Stephen F. Wolf

(57) ABSTRACT

A rechargeable lithium-ion cell contains a positive electrode, negative electrode, charge-carrying electrolyte containing charge carrying medium and lithium salt, and an N-substituted or C-substituted phenothiazine compound dissolved in or dissolvable in the electrolyte. The substituted phenothiazine compound has an oxidation potential above the positive electrode recharged potential and serves as a cyclable redox chemical shuttle providing cell overcharge protection.

17 Claims, 22 Drawing Sheets

FOREIGN PATENT DOCUMENTS

| | | |
|---|---|---|
| WO | WO 00/03444 | 1/2000 |
| WO | WO 01/29920 A1 | 4/2001 |
| WO | WO 2005/069405 A2 | 7/2005 |

OTHER PUBLICATIONS

Narayanan, S. R., et al., "Analysis of Redox Additive-Based Overcharge Protection for Rechargeable Lithium Batteries," *Journal of the Electrochemical Society*, vol. 138, No. 8, Aug. 1, 1991, pp. 2224-2229.

T. J. Richardson, P. N. Ross, Jr., "Overcharge Protection for Rechargeable Lithium Polymer Electrolyte Batteries", *J. Electrochem. Soc.*, vol. 143, 3992-3996 (1996).

K. M. Colbow, J. R. Dahn, R. R. Haering, "Structure and Electrochemistry of the Spinel Oxides $LiTi_2O_4$ and $Li_{4/3}Ti_{5/3}O_4$", *J. Power Sources*, vol. 26, 397-402 (1989).

A. M. Wilson and J. R. Dahn, "Lithium Insertion in Carbons Containing Nanodispersed Silicon", *J. Electrochem. Soc.*, vol. 142, 326-332 (1995).

\* cited by examiner

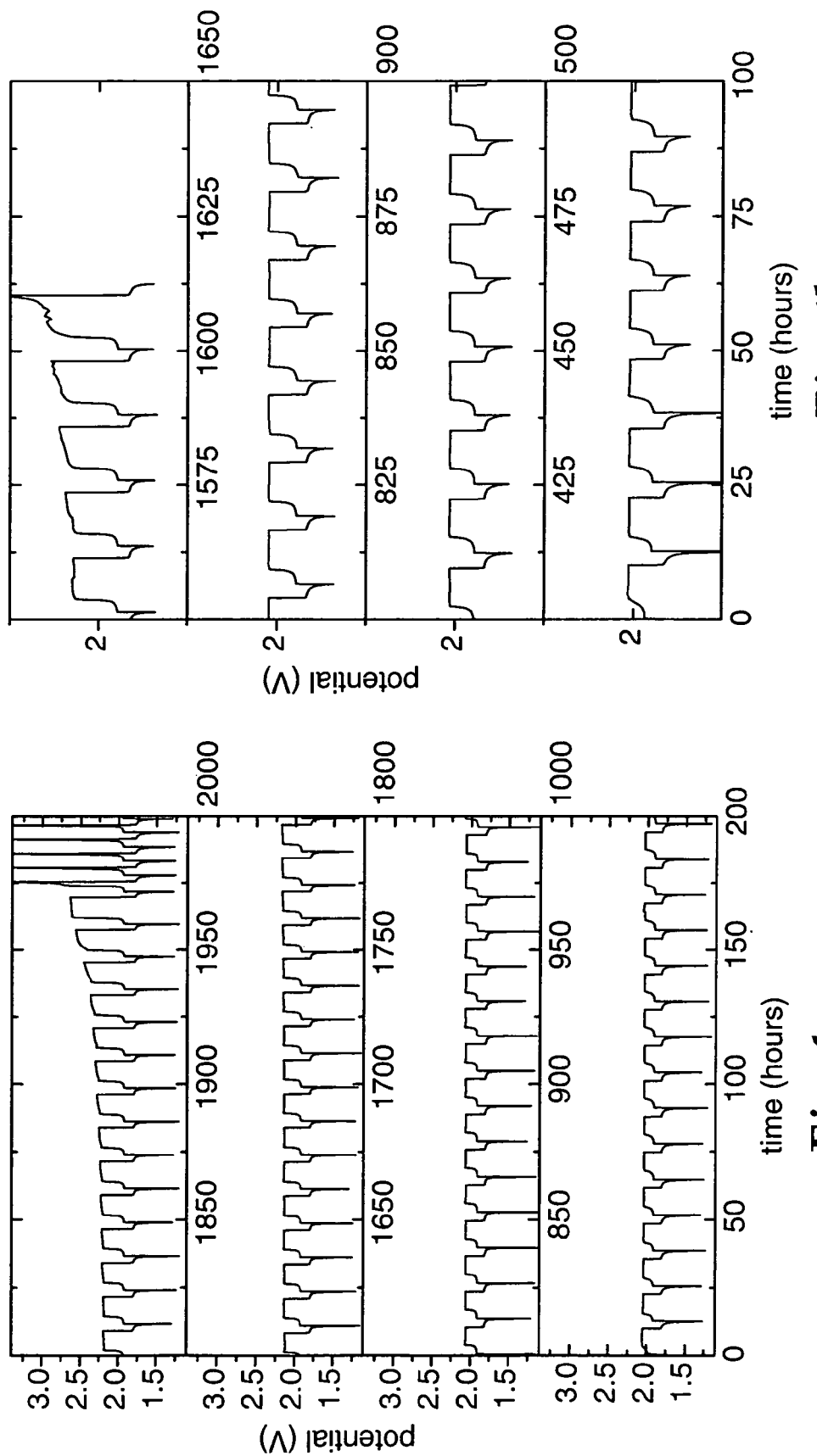

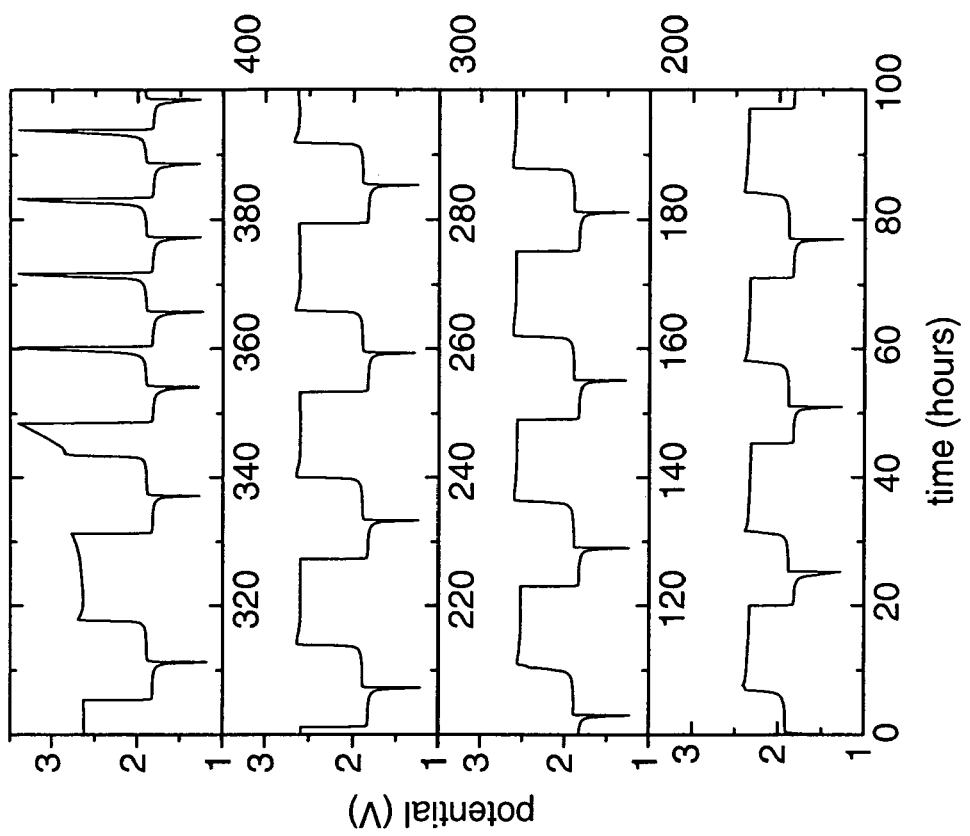
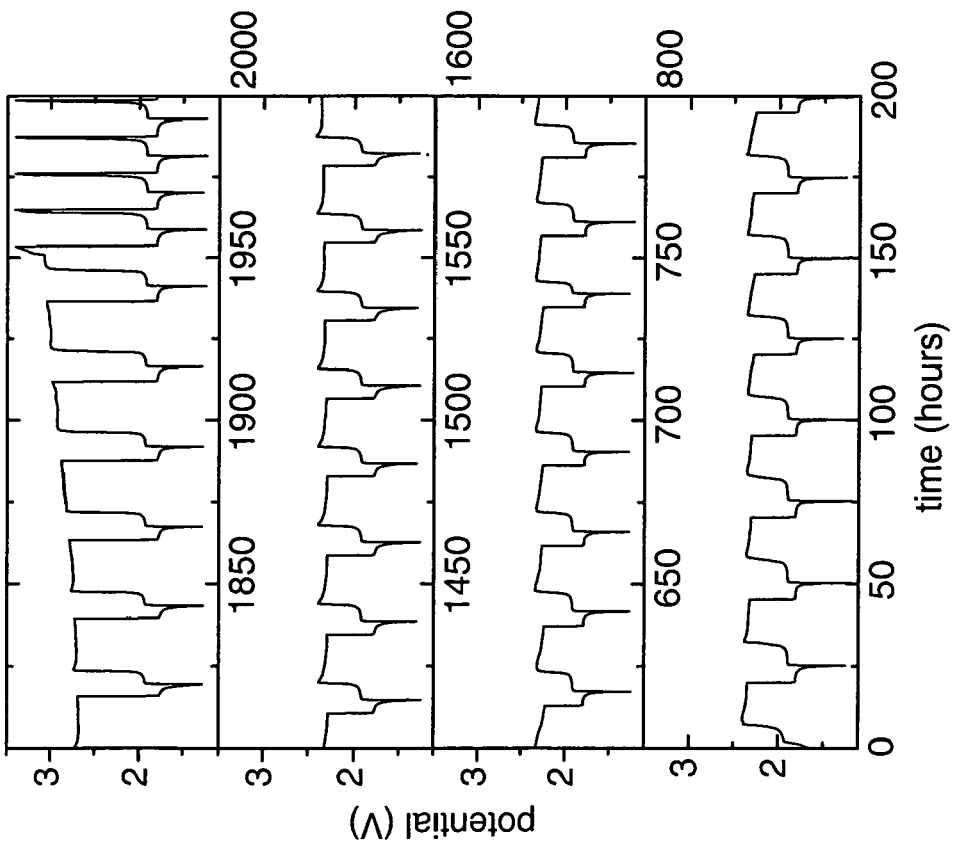
Fig. 15b
Fig. 15a

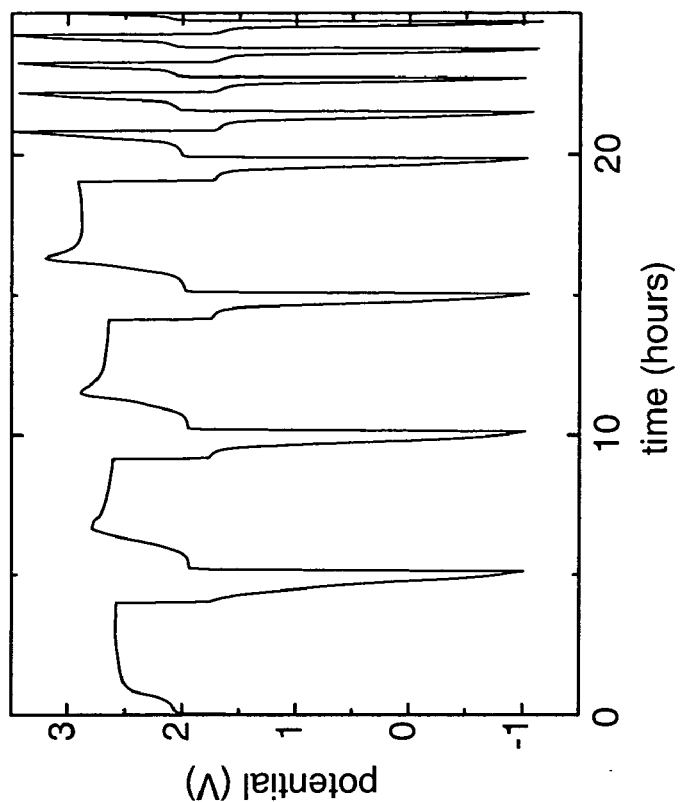
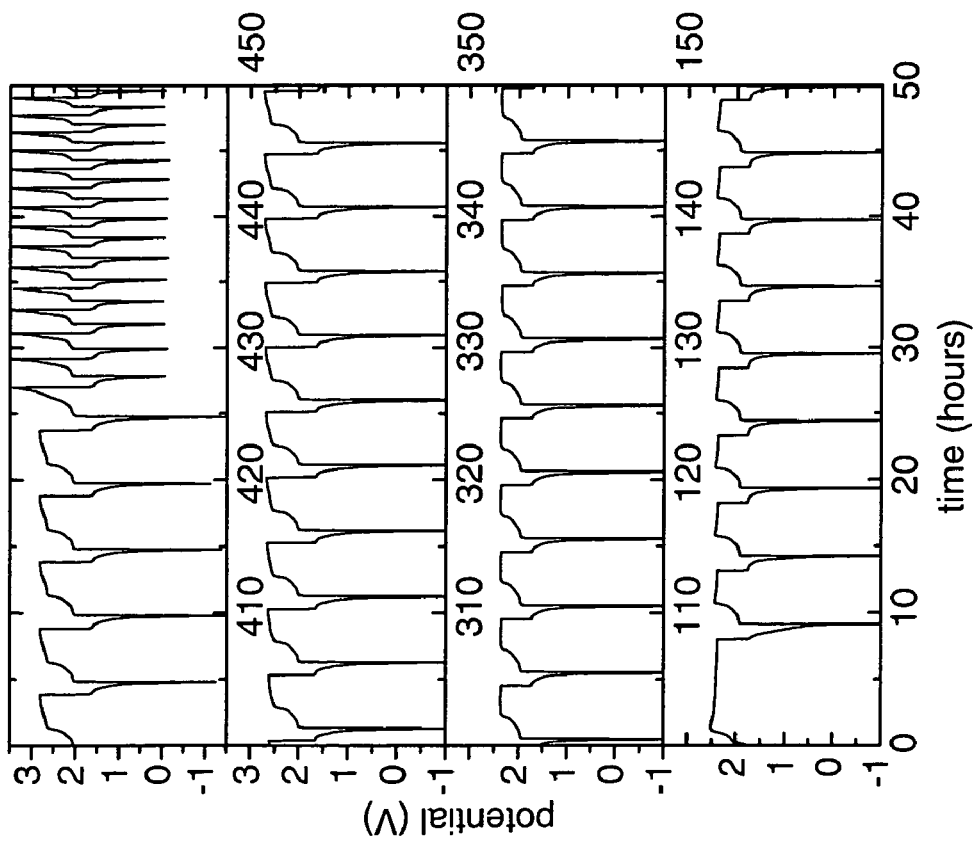
Fig. 20a
Fig. 20b

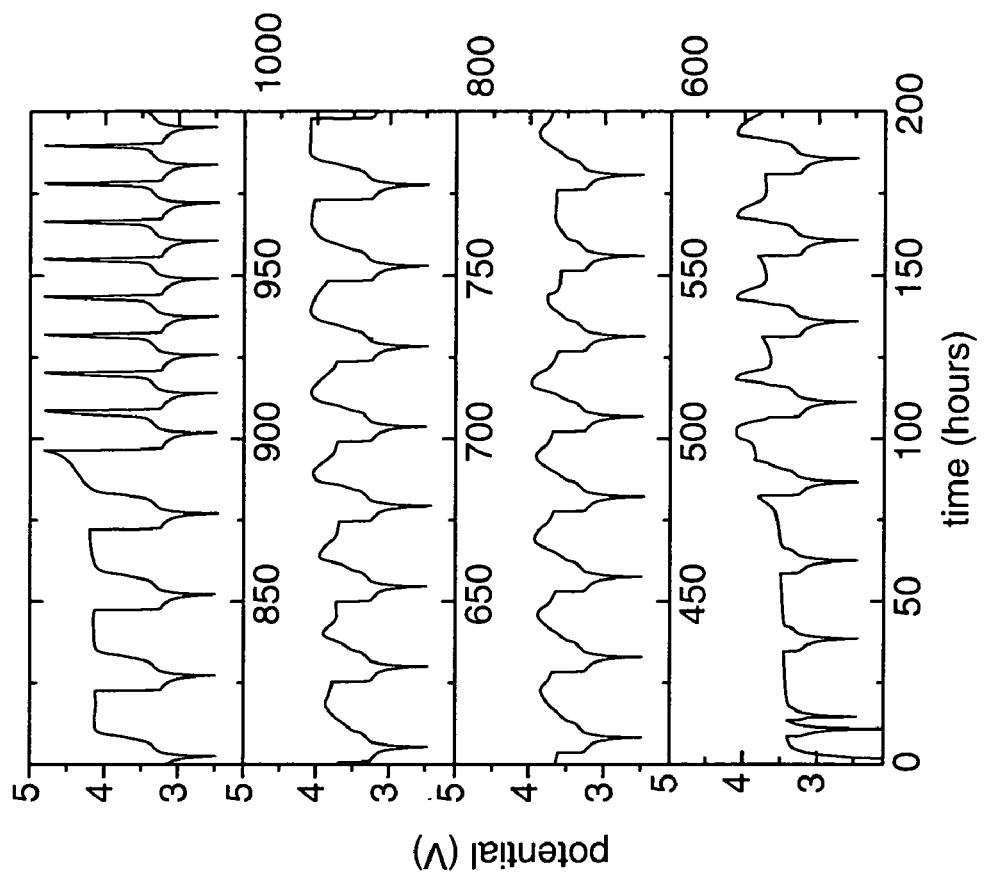
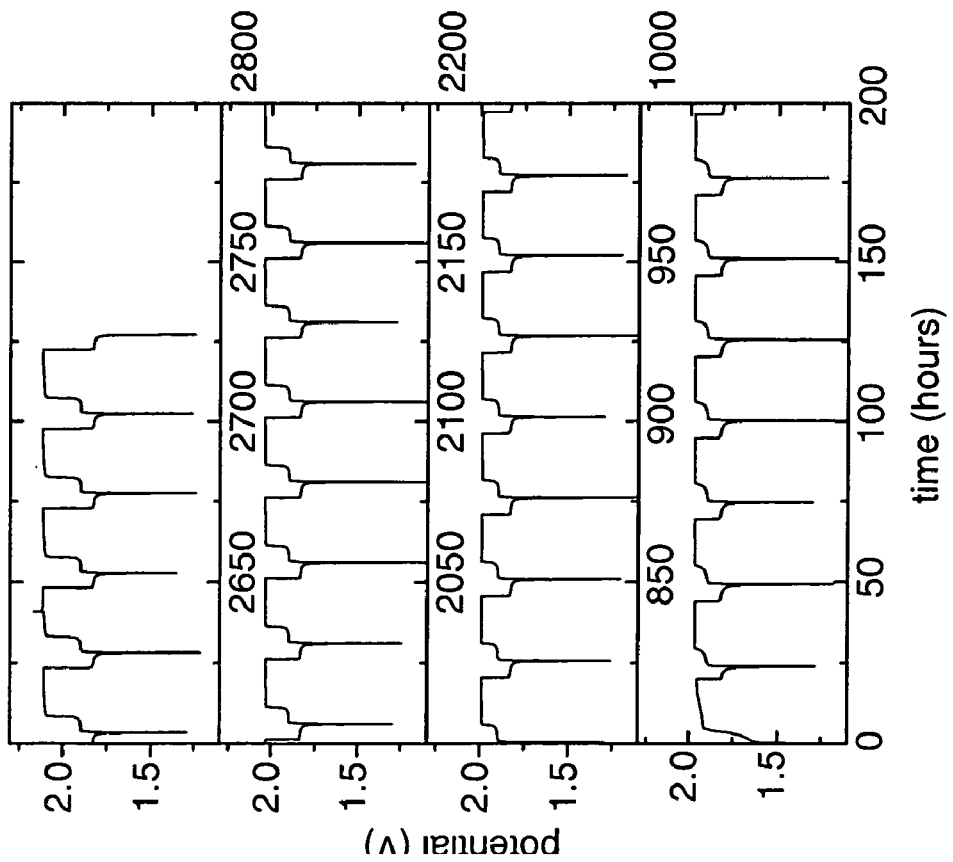
Fig. 25b
Fig. 25a

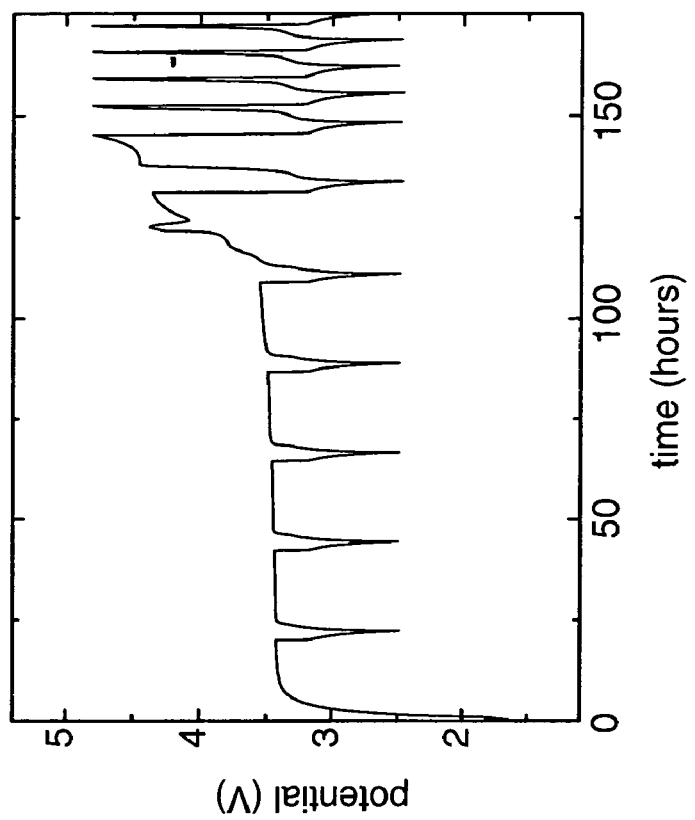
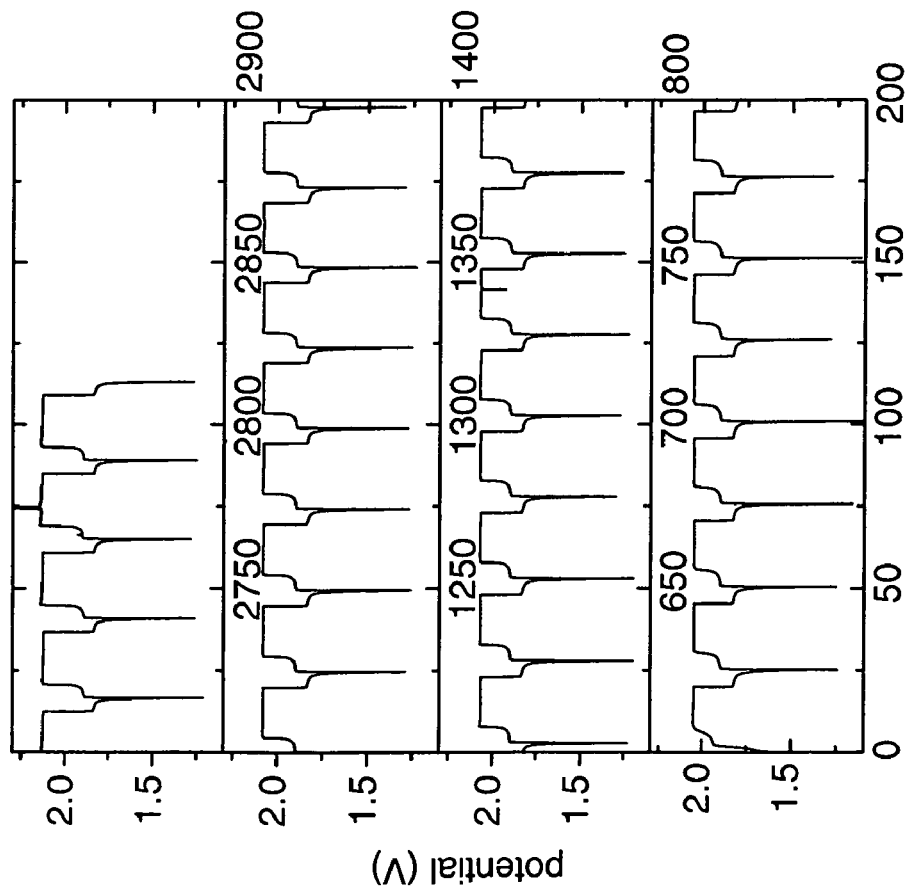
Fig. 27b
Fig. 27a

US 7,615,312 B2

SUBSTITUTED PHENOTHIAZINE REDOX SHUTTLES FOR RECHARGEABLE LITHIUM-ION CELL

FIELD OF THE INVENTION

This invention relates to overcharge protection in rechargeable lithium-ion cells.

BACKGROUND

When properly designed and constructed, rechargeable lithium-ion cells can exhibit excellent charge-discharge cycle life, little or no memory effect, and high specific and volumetric energy. However, lithium-ion cells do have some shortcomings, including an inability to tolerate recharging to potentials above the manufacturer's recommended end of charge potential without degradation in cycle life; the danger of overheating, fire or explosion for cells recharged to potentials above the recommended end of charge potential; and difficulties in making large cells having sufficient tolerance to electrical and mechanical abuse for consumer applications. Single and connected (e.g., series-connected) lithium-ion cells typically incorporate charge control electronics to prevent individual cells from exceeding the recommended end of charge potential. This circuitry adds cost and complexity and has discouraged the use of lithium ion cells and batteries in low-cost mass market electrical and electronic devices such as flashlights, radios, CD players and the like. Instead, these low-cost devices typically are powered by non-rechargeable batteries such as alkaline cells.

Various chemical moieties have been proposed for imparting overcharge protection to rechargeable lithium-ion cells. Chemical moieties designated as "redox shuttles" or "shuttles" may in theory provide an oxidizable and reducible charge-transporting species that may repeatedly transport charge between the negative and positive electrodes once the charging potential reaches a desired value. Materials that function as fuses or shunts to provide one-time or limited-time cell overcharge protection have also been proposed.

Phenothiazine compounds have been used for various purposes in lithium-ion cells. References involving such uses include U.S. Pat. No. 4,869,977 (Connolly et al.) and U.S. Pat. No. 5,976,731 (Negoro et al.), and Japanese Published Patent Application Nos. 5-295058 (Yuasa Corp.), 2001-15156 (Sony Corp. '156) and 2001-23687 (Sony Corp. '687).

SUMMARY OF THE INVENTION

The invention provides in one aspect a rechargeable lithium-ion cell comprising:
(a) a positive electrode having a recharged potential;
(b) a negative electrode;
(c) a charge-carrying electrolyte comprising a charge carrying medium and a lithium salt; and
(d) a cyclable redox chemical shuttle comprising an N-substituted or C-substituted phenothiazine compound dissolved in or dissolvable in the electrolyte and having an oxidation potential above the recharged potential of the positive electrode.

The invention provides in another aspect a method for manufacturing a rechargeable lithium-ion sealed cell comprising the steps of assembling in any order and enclosing in a suitable case:
(a) a positive electrode having a recharged potential;
(b) a negative electrode;
(c) a charge-carrying electrolyte comprising a charge carrying medium and a lithium salt; and
(d) a cyclable redox chemical shuttle comprising an N-substituted or C-substituted phenothiazine compound dissolved in or dissolvable in the electrolyte and having an oxidation potential above the recharged potential of the positive electrode.

The invention provides in yet another aspect a method for recharging a lithium-ion cell while chemically limiting cell damage due to overcharging comprising supplying charging current across a positive electrode and a negative electrode of a lithium-ion rechargeable cell containing a charge-carrying electrolyte. The charge-carrying electrolyte comprises a charge carrying medium, a lithium salt and a cyclable redox chemical shuttle comprising an N-substituted or C-substituted phenothiazine compound dissolved in the electrolyte and having an oxidation potential above the recharged potential of the positive electrode.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

FIG. 2a, FIG. 2b, FIG. 3a, FIG. 3b, FIG. 4a, FIG. 4b, FIG. 5a, FIG. 5b and FIG. 6 respectively are plots showing cell potential during successive charge-discharge cycles for four time spans in the Example 1, Run Nos. 1-1 through 1-9 cell charge-discharge tests.

FIG. 15a, FIG. 15b, FIG. 16, FIG. 17a, FIG. 17b, FIG. 18, FIG. 19 and FIG. 20a respectively are plots showing cell potential during successive charge-discharge cycles for four time spans in the Example 4, Run Nos. 4-1 through 4-8 cell charge-discharge tests.

FIG. 20b, FIG. 21a, FIG. 21b, FIG. 22 and FIG. 23 respectively are plots showing cell potential during successive charge-discharge cycles for the Example 4, Run Nos. 4-9 through 4-13 cell charge-discharge tests.

FIG. 24, FIG. 25a, FIG. 25b, FIG. 26a, FIG. 26b and FIG. 27a respectively are plots showing cell potential during successive charge-discharge cycles for four time spans in the Example 5, Run Nos. 5-1 through 5-6 cell charge-discharge tests.

FIG. 27b is a plot showing cell potential during successive charge-discharge cycles for the Example 5, Run No. 5-7 cell charge-discharge test.

DETAILED DESCRIPTION

Figure 6:
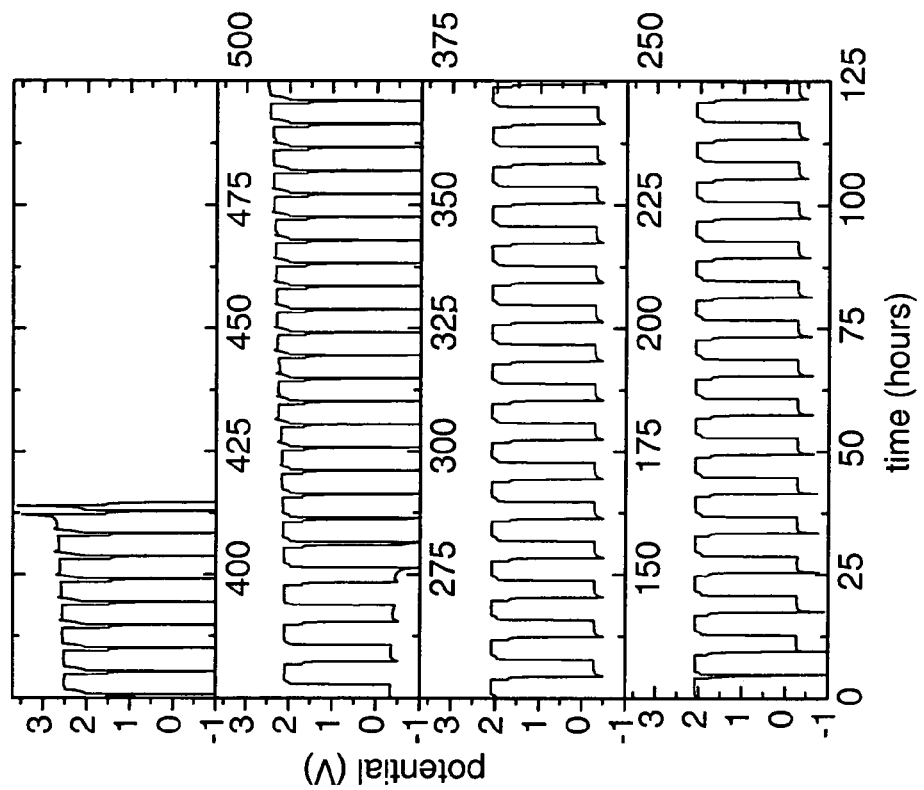

The phrase "positive electrode" refers to one of a pair of rechargeable lithium-ion cell electrodes that under normal circumstances and when the cell is fully charged will have the highest potential. We retain this terminology to refer to the same physical electrode under all cell operating conditions even if such electrode temporarily (e.g., due to cell overdischarge) is driven to or exhibits a potential below that of the other (the negative) electrode.

The phrase "negative electrode" refers to one of a pair of rechargeable lithium-ion cell electrodes that under normal circumstances and when the cell is fully charged will have the lowest potential. We retain this terminology to refer to the same physical electrode under all cell operating conditions even if such electrode is temporarily (e.g., due to cell over-discharge) driven to or exhibits a potential above that of the other (the positive) electrode.

The phrase "redox chemical shuttle" refers to an electrochemically reversible moiety that during charging of a lithium-ion cell can become oxidized at the positive electrode, migrate to the negative electrode, become reduced at the negative electrode to reform the unoxidized (or less-oxidized) shuttle species, and migrate back to the positive electrode.

When used with respect to a positive electrode, the phrase "recharged potential" refers to a value $E_{cp}$ measured relative to Li/Li$^+$ by constructing a cell containing the positive electrode, a lithium metal negative electrode and an electrolyte but no redox chemical shuttle, carrying out a charge/discharge cycling test and observing the potential at which the positive electrode becomes delithiated during the first charge cycle to a lithium level corresponding to at least 90% of the available recharged cell capacity. For some positive electrodes (e.g., LiFePO$_4$), this lithium level may correspond to approximately complete delithiation (e.g., to Li$_0$FePO$_4$). For other positive electrodes (e.g., some electrodes having a layered lithium-containing structure), this lithium level may correspond to partial delithiation.

The word "cyclable" when used in connection with a redox chemical shuttle refers to a material that when exposed to a charging voltage sufficient to oxidize the material (e.g., from a neutral to a cationic form, or from a less-oxidized state to a more oxidized state) and at an overcharge charge flow equivalent to 100% of the cell capacity will provide at least two cycles of overcharge protection for a cell containing the chosen positive electrode.

The term "phase" refers to a homogeneous liquid portion that is present or that can form in a liquid system. The term "phases" refers to the presence of more than one phase in a heterogeneous liquid system. When used with respect to a mixture of a redox chemical shuttle and electrolyte, the terms "dissolved" and "dissolvable" refer to a shuttle that when present in or added to the electrolyte forms or will form a single phase solution containing a mobile charge-carrying moiety in an amount sufficient to provide overcharge protection at a charging current rate sufficient to charge fully in 10 hours or less a lithium-ion cell containing the chosen positive electrode, negative electrode and electrolyte.

When used with respect to a redox chemical shuttle, the phrase "oxidation potential" refers to a value $E_{cv}$. $E_{cv}$ may be measured by dissolving the shuttle in the chosen electrolyte, measuring current flow vs. voltage using cyclic voltammetry and a platinum or glassy carbon working electrode, a copper counter electrode and a non-aqueous Ag/AgCl reference electrode that has been previously referenced to Li/Li+ and determining the potentials $V_{up}$ (viz., during a scan to more positive potentials) and $V_{down}$ (viz., during a scan to more negative potentials), relative to Li/Li$^+$, at which peak current flow is observed. $E_{cv}$ will be the average of $V_{up}$ and $V_{down}$. Shuttle oxidation potentials may be closely estimated (to provide a value "$E_{obs}$") by constructing a cell containing the shuttle, carrying out a charge/discharge cycling test, and observing during a charging sequence the potential at which a voltage plateau indicative of shuttle oxidation and reduction occurs. The observed result may be corrected by the amount of the negative electrode potential vs. Li/Li$^+$ to provide an $E_{obs}$ value relative to Li/Li$^+$. Shuttle oxidation potentials may be approximated (to provide a value "$E_{calc}$") using modeling software such as GAUSSIAN 03™ from Gaussian Inc. to predict oxidation potentials (e.g., for compounds whose $E_{cv}$ is not known) by correlating model ionization potentials to the oxidation potentials and lithium-ion cell behavior of measured compounds.

A variety of positive electrodes may be employed in the disclosed lithium-ion cells. Some positive electrodes may be used with a wide range of phenothiazine compounds, whereas other positive electrode materials having relatively high recharged potentials may be usable only with a smaller range of phenothiazine compounds having suitably higher oxidation potentials. Representative positive electrodes and their approximate recharged potentials include FeS$_2$ (3.0 V vs. Li/Li$^+$), LiCoPO$_4$ (4.8 V vs. Li/Li$^+$), LiFePO$_4$ (3.45 V vs. Li/Li$^+$), Li$_2$FeS$_2$ (3.0 V vs. Li/Li$^+$), Li$_2$FeSiO$_4$ (2.9 V vs. Li/Li$^+$), LiMn$_2$O$_4$ (4.1 V vs. Li/Li$^+$), LiMnPO$_4$ (4.1 V vs. Li/Li$^+$), LiNiPO$_4$ (5.1 V vs. Li/Li$^+$), LiV$_3$O$_8$ (3.7 V vs. Li/Li$^+$), LiV$_6$O$_{13}$ (3.0 V vs. Li/Li$^+$), LiVOPO$_4$ (4.15 V vs. Li/Li$^+$), LiVOPO$_4$F (4.3 V vs. Li/Li$^+$), Li$_3$V$_2$(PO$_4$)$_3$ (4.1 V (2 Li) or 4.6 V (3 Li) vs. Li/Li$^+$), MnO$_2$ (3.4 V vs. Li/Li$^+$), MoS$_3$ (2.5 V vs. Li/Li$^+$), sulfur (2.4 V vs. Li/Li$^+$), TiS$_2$ (2.5 V vs. Li/Li$^+$), TiS$_3$ (2.5 V vs. Li/Li$^+$), V$_2$O$_5$ (3.6 V vs. Li/Li$^+$), V$_6$O$_{13}$ (3.0 V vs. Li/Li$^+$), and combinations thereof. Powdered lithium (e.g., LECTRO™ MAX stabilized lithium metal powder, from FMC Corp., Gastonia, N.C.) may be included in the positive electrode as formed. Lithium may also be incorporated into the negative electrode so that extractible lithium will be available for incorporation into the positive electrode during initial discharging. Some positive electrode materials may depending upon their structure or composition be charged at a number of voltages, and thus may be used as a positive electrode if an appropriate form and appropriate cell operating conditions are chosen. Electrodes made from LiFePO$_4$, Li$_2$FeSiO$_4$, Li$_x$MnO$_2$ (where x is about 0.3 to about 0.4, and made for example by heating a stoichiometric mixture of electrolytic manganese dioxide and LiOH to about 300 to about 400° C.) or MnO$_2$ (made for example by heat treatment of electrolytic manganese dioxide to about 350° C.) can provide cells having especially desirable performance characteristics when used with phenothiazine compounds having oxidation potentials of about 3.6 to about 4.0 V. The positive electrode may contain additives as will be familiar to those skilled in the art, e.g., carbon black, flake graphite and the like. As will be appreciated by those skilled in the art, the positive electrode may be in any convenient form including foils, plates, rods, pastes or as a composite made by forming a coating of the positive electrode material on a conductive current collector or other suitable support.

A variety of negative electrodes may be employed in the disclosed lithium-ion cells. Representative negative electrodes include graphitic carbons e.g., those having a spacing between (002) crystallographic planes, $d_{002}$ of 3.45 Å>$d_{002}$>3.354 Å and existing in forms such as powders, flakes, fibers or spheres (e.g., mesocarbon microbeads); lithium metal; $Li_{4/3}Ti_{5/3}O_4$; the lithium alloy compositions described in U.S. Pat. No. 6,203,944 (Turner '944) entitled "ELECTRODE FOR A LITHIUM BATTERY" and PCT Published Patent Application No. WO 00103444 (Turner PCT) entitled "ELECTRODE MATERIAL AND COMPOSMONS"; Sn—Co-based amorphous negative electrodes (e.g., the negative electrode in the NEXELION™ hybrid lithium-ion battery from Sony Corp.); and combinations thereof. A negative electrode containing extractible lithium (e.g., a lithium metal electrode, extractible lithium alloy electrode, or electrode containing powdered lithium) may be employed so that extractible lithium will be incorporated into the positive electrode during initial discharging. The negative electrode may contain additives as will be familiar to those skilled in the art, e.g., carbon black. As will be appreciated by those skilled in the art, the negative electrode may be in any convenient form including foils, plates, rods, pastes or as a composite made by forming a coating of the negative electrode material on a conductive current collector or other suitable support.

The electrolyte provides a charge-carrying pathway between the positive and negative electrodes, and initially contains at least the charge carrying media and the lithium salt. The electrolyte may include other additives that will be familiar to those skilled in the art. As will be appreciated by those skilled in the art, the electrolyte may be in any convenient form including liquids and gels.

A variety of charge carrying media may be employed in the electrolyte. Exemplary media are liquids or gels capable of solubilizing sufficient quantities of lithium salt and redox chemical shuttle so that a suitable quantity of charge can be transported from the positive electrode to negative electrode. Exemplary charge carrying media can be used over a wide temperature range, e.g., from about −30° C. to about 70° C. without freezing or boiling, and are stable in the electrochemical window within which the cell electrodes and shuttle operate. Representative charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butyrolactone, methyl difluoroacetate, ethyl difluoroacetate, dimethoxyethane, diglyme (bis(2-methoxyethyl)ether) and combinations thereof.

A variety of lithium salts may be employed in the electrolyte. Exemplary lithium salts are stable and soluble in the chosen charge-carrying media and perform well in the chosen lithium-ion cell, and include $LiPF_6$, $LiBF_4$, $LiClO_4$, lithium bis(oxalato)borate ("LiBOB"), $LiN(CF_3SO_2)_2$, $LiN(C_2F_5SO_2)_2$, $LiAsF_6$, $LiC(CF_3SO_2)_3$ and combinations thereof.

The electrolyte also conveniently contains the dissolved redox chemical shuttle. The electrolyte may however if desired be formulated without dissolved redox chemical shuttle, and incorporated into a cell whose positive or negative electrode contains dissolvable redox chemical shuttle that can dissolve into the electrolyte after cell assembly or during the first charge-discharge cycle, so that the electrolyte will contain dissolved redox chemical shuttle once the cell has been put into use.

A variety of N-substituted and C-substituted phenothiazine redox shuttle compounds (sometimes referred to below as "substituted phenothiazine compounds") may be employed in the disclosed lithium-ion cells. When an attempt is made to charge the cell above the shuttle compound oxidation potential, the oxidized shuttle molecules carry a charge quantity corresponding to the applied charging current to the negative electrode, thus preventing cell overcharge. Especially preferred shuttle materials are sufficiently cyclable to provide at least 10, at least 15, at least 30, at least 50, at least 80 or at least 100 cycles of overcharge protection at a charging voltage sufficient to oxidize the material and at an overcharge charge flow equivalent to 100% of the cell capacity during each cycle. The substituted phenothiazine compounds are different from the positive electrode and have an oxidation potential different from and higher (viz., more positive) than the positive electrode recharged potential. The substituted phenothiazine compound oxidation potential desirably is just slightly higher than the positive electrode recharged potential, below the potential at which irreversible cell damage might occur, and desirably below the potential at which excessive cell heating or outgassing might occur. As a general numeric guide for typical lithium-ion cell constructions, the substituted phenothiazine compound may for example have an oxidation potential from about 0.3 V to about 5 V above the positive electrode recharged potential; from about 0.3 to about 1 V above the positive electrode recharged potential; or from about 0.3 to about 0.6 V above the positive electrode recharged potential. For example, $LiFePO_4$ positive electrodes have a recharged potential of about 3.45 V vs. $Li/Li^+$, and exemplary substituted phenothiazine compounds for use with such electrodes desirably have an oxidation potential of about 3.7 to about 4.5 V vs. $Li/Li^+$. $Li_2FeSiO_4$ positive electrodes have a recharged potential of around 2.8 V vs. $Li/Li^+$, and exemplary phenothiazine compounds for use with such electrodes desirably have an oxidation potential of about 3.1 to about 3.8 V vs. $Li/Li^+$. $Li_xMnO_2$ (where x is about 0.3 to 0.4) and $MnO_2$ positive electrodes have a recharged potential of about 3.4V vs. $Li/Li^+$, and exemplary phenothiazine compounds for use with such electrodes desirably have an oxidation potential of about 3.7 to about 4.4 V vs. $Li/Li^+$.

The substituted phenothiazine compounds may be described using the ring numbering system (I) shown below:

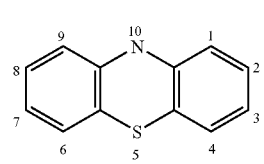

(I)

The substituted phenothiazine compounds are N-substituted (viz., they have a substituent on the nitrogen atom) or C-substituted (viz., they have a substituent on a ring carbon atom) and thus may be substituted at the 1 to 4 or 6 to 10 ring positions. Exemplary substituents include alkyl groups (containing, for example, 1 to about 4 carbon atoms, such as methyl, ethyl, propyl, isopropyl, butyl, sec-butyl or tert-butyl groups), haloalkyl groups (containing, for example, 1 to about 4 carbon atoms) such as perhaloalkyl groups (containing, for example, 1 to about 4 carbon atoms). Other exemplary substituents include acyl (e.g., acetyl), acyloxy, alkaryl, alkoxy, acetamido, amido, amino, aryl, aralkyl, alkyl carboxyl, aryl carboxyl, alkylsulfonyl, benzoyl, carbamoyl, carbamido, carboxy, cyano, formyl, halo, haloacetamido, haloacyl (e.g., perfluoroacyl), haloalkylsulfonyl (e.g., perfluoroalkylsulfonyl), haloaryl (e.g., perfluoroaryl), hydroxyl, isothiocyanato, methylsulfonyloxyl, nitro, oxo, oxybenzoyl or phosphenoxy groups, and combinations thereof. The substituted phenothiazine compound may be substituted with one or with more than one group. Through appropriate ligand substitution, the substituted phenothiazine compound oxidation potential may be raised or lowered to provide better recharge protection for a desired positive electrode material. The substituted phenothiazine compound may be a salt, e.g., salts containing metal cation complexes, quaternary ammonium salts or phosphonium salts. The substituted phenothiazine compound may contain additional substituents so long as such additional substituents do not unduly interfere with the phenothiazine compound's charge-carrying capability, oxidation potential, solubility in the electrolyte or stability. Especially preferred substituted phenothiazine compounds include N-substituted compounds. Several exemplary phenothiazine compounds and their $E_{obs}$ values (and where noted, their $E_{calc}$ values) are shown below in Table A:

TABLE A

Phenothiazine Compounds and Their Oxidation Potentials

| Name | Structure | Oxidation Potential (V vs. Li/Li$^+$) |
| --- | --- | --- |
| 2-(perfluoromethyl)-phenothiazine | | 3.60 ($E_{obs}$) |
| 10-methyl-phenothiazine (MPT) | | 3.47 ($E_{obs}$)<br>3.30 ($E_{calc}$) |
| 10-ethyl-phenothiazine (EPT) | | 3.47 ($E_{obs}$)<br>3.41 ($E_{calc}$) |
| 3-chloro-10-ethyl-phenothiazine (3-chloroEPT) | | 3.53 ($E_{obs}$)<br>3.50 ($E_{calc}$) |
| 10-isopropyl-phenothiazine (IPT) | | 3.50 ($E_{obs}$) |
| 10-acetyl-phenothiazine (APT) | | 3.88 ($E_{obs}$)<br>3.59 ($E_{calc}$) |
| 10-perfluoromethyl-phenothiazine | | 4.10 ($E_{calc}$) |

TABLE A-continued

Phenothiazine Compounds and Their Oxidation Potentials

| Name | Structure | Oxidation Potential (V vs. Li/Li$^+$) |
|---|---|---|
| 10-perfluoromethylsulfonyl-phenothiazine | | 4.48/4.50 ($E_{calc}$) |
| 2-methoxy-10-perfluoromethylsulfonyl-phenothiazine | | 4.45 ($E_{calc}$) |
| 2-perfluoromethyl-10-perfluoromethylsulfonyl-phenothiazine | | 4.71 ($E_{calc}$) |
| 2-cyano-10-perfluoromethylsulfonyl-phenothiazine | | 4.70 ($E_{calc}$) |
| 10-(1,1,1,2,3,3)-hexafluoropropyl-phenothiazine | | 4.05 ($E_{calc}$) |

Other exemplary phenothiazine compounds include, but are not limited to, 2-chloro-10-methyl-phenothiazine, 2-ethyl-10-methyl-phenothiazine, 3-bromo-10-ethyl-phenothiazine, 3-chloro-10-methyl-phenothiazine, 3-iodo-10-methyl-phenothiazine, 10-methyl-phenothiazin-3-ol, 10-methyl-phenothiazin-3ylamine, 2,10-dimethyl-phenothiazine, 3,10-dimethyl-phenothiazine, 3-methyl-10-ethyl-phenothiazine, 4,10-dimethyl-phenothiazine, 3,7,10-trimethyl-phenothiazine, 10-(2-chloroethyl)-phenothiazine, 10-formyl-phenothiazine, 10-methoxy-phenothiazine, 10-methoxymethyl-phenothiazine, 10-perfluoroethyl-phenothiazine, 10-phenyl-phenothiazine, 10-propionyl-phenothiazine, 10-methyl-phenothiazine-4-carboxylic acid and the like.

Mixtures of two or more shuttle materials having different electrochemical potentials vs. Li/Li$^+$ may also be employed. For example, a first shuttle material operative at 3.7V and a second shuttle material operative at 3.9V may both be employed in a single cell. If after many charge/discharge cycles the first shuttle material degrades and loses its effectiveness, the second shuttle material (which would not meanwhile have been oxidized while the first shuttle material was operative) could take over and provide a further (albeit higher $E_{cv}$) margin of safety against overcharge damage.

The shuttle material can also provide overdischarge protection to a cell or to a battery of series-connected cells, as described further in copending U.S. patent application Ser. No. 11/095,185, entitled "REDOX SHUTTLE FOR OVERDISCHARGE PROTECTION IN RECHARGEABLE LITHIUM-ION BATTERIES", filed Mar. 31, 2005, the disclosure of which is incorporated herein by reference.

The substituted phenothiazine compound is dissolved or dissolvable in the electrolyte in an amount sufficient to provide overcharge protection at the intended charging rate. According to the literature (Richardson et al., *J. Electrochem. Soc.* Vol. 143, 3992 (1996)) the maximum shuttle current for a singly ionized shuttle is given by $$I_{max} = FADC/d, \qquad [II]$$

where F is Faraday's number, A is the electrode area, D is an effective diffusion constant of the shuttle species (taking into account both oxidized and reduced forms of the shuttle), C is the total concentration of the shuttle species and d is the distance between the electrodes. To obtain a large shuttle current, the electrolyte should impart a large diffusion constant D to the shuttle and support a high shuttle concentration C. Thus the electrolyte desirably initially or eventually contains an ample dissolved quantity of suitably mobile substituted phenothiazine compound. The shuttle diffusion constant D usually will increase as the electrolyte solution viscosity decreases. Exemplary concentrations of the substituted phenothiazine compound in the electrolyte are about 0.05 M up to the limit of solubility, more than 0.1 M up to the limit of solubility, about 0.2 M up to the limit of solubility or about 0.3 M up to the limit of solubility. The phenothiazine compound concentration may in some instances be increased by incorporating a suitable cosolvent in the electrolyte. Exemplary cosolvents include acetonitrile, benzene, ethers (e.g., dimethyl ether), esters (e.g., ethyl acetate or methyl acetate), lactones (e.g., gamma-butyrolactone), pyridine, tetrahydrofuran, toluene and combinations thereof.

The disclosed lithium-ion cells may include a porous cell separator located between the positive and negative electrodes and through which charge-carrying species (including the oxidized or reduced shuttle compound) may pass. Suitable separators will be familiar to those skilled in the art. The disclosed cells may be sealed in a suitable case, e.g., in mating cylindrical metal shells such as in a coin-type cell, in an elongated cylindrical AAA, AA, C or D cell casing or in a replaceable battery pack as will be familiar to those skilled in the art. The disclosed cells may be used in a variety of devices, including portable computers, tablet displays, personal digital assistants, mobile telephones, motorized devices (e.g., personal or household appliances and vehicles), instruments, illumination devices (e.g., flashlights) and heating devices. The disclosed cells may have particular utility in low-cost mass market electrical and electronic devices such as flashlights, radios, CD players and the like, which heretofore have usually been powered by non-rechargeable batteries such as alkaline cells. Further details regarding the construction and use of rechargeable lithium-ion cells will be familiar to those skilled in the art.

The invention is further illustrated in the following illustrative examples, in which all parts and percentages are by weight unless otherwise indicated.

EXAMPLE 1

Negative electrodes were made from $Li_{4/3}Ti_{5/3}O_4$ (synthesized according to the procedure shown in K. M. Colbow, R. R. Haering and J. R. Dahn, "Structure and Electrochemistry of the Spinel Oxides $LiTi_2O_4$ and $Li_{4/3}Ti_{5/3}O_4$", *J. Power Sources*, 26, 397-402 (1989)) using the following procedure. 100 Parts of the negative electrode active material (viz., $Li_{4/3}Ti_{5/3}O_4$), 5 parts KYNAR™ 301P polyvinylidene fluoride (commercially available from Atofina Chemicals, Philadelphia, Pa.) and 5 parts SUPER S™ Carbon Black (commercially available from MMM Carbon, Tertre, Belgium) were mixed with N-methylpyrrolidinone to form a slurry. After thorough mixing in a polyethylene bottle containing spheres of ZIRCOA™ 6.35 mm diameter zirconium oxide banded satellite spherical media (commercially available from Zircoa, Inc., Solon, Ohio), the slurry was coated in a thin film on an aluminum foil current collector. The resulting coated electrode foil was dried in air overnight at 90° C. Individual 1.3 cm diameter electrode discs were cut from the electrode foil using a precision punch. Positive electrodes were made the same way using $LiFePO_4$ (commercially available from Phostech Lithium, Ste-Foy, Quebec, Canada) as the active material.

Electrolytes were prepared by dissolving 0.1 M 10-methylphenothiazine ("MPT") and 0.5 M of the indicated lithium salts in the charge carrying media propylene carbonate ("PC"), dimethyl carbonate ("DMC"), ethylene carbonate ("EC") and diethyl carbonate ("DEC") in a 1:2:1:2 PC/DMC/EC/DEC volume ratio to form single phase electrolyte solutions. MPT was obtained from Sigma-Aldrich Co. (Milwaukee, Wis.). Lithium bisoxalatoborate ("LiBOB") was obtained from Chemetall Group of Dynamit Nobel AG, Troisdorf, Germany, and $LiPF_6$ (manufactured by Stella Chemifa Corp., Japan) was obtained from E-One/Moli Energy Canada. The charge carrying media were obtained from E-One/Moli Energy Canada.

Figure 1:
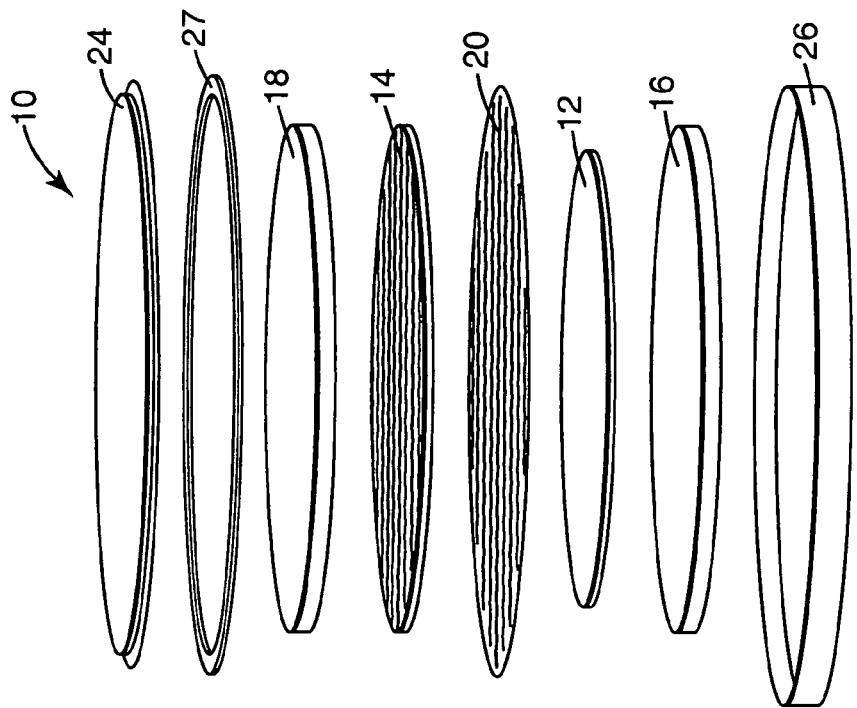
FIG. 1 is an exploded perspective schematic view of an electrochemical cell.
Figure 2B:
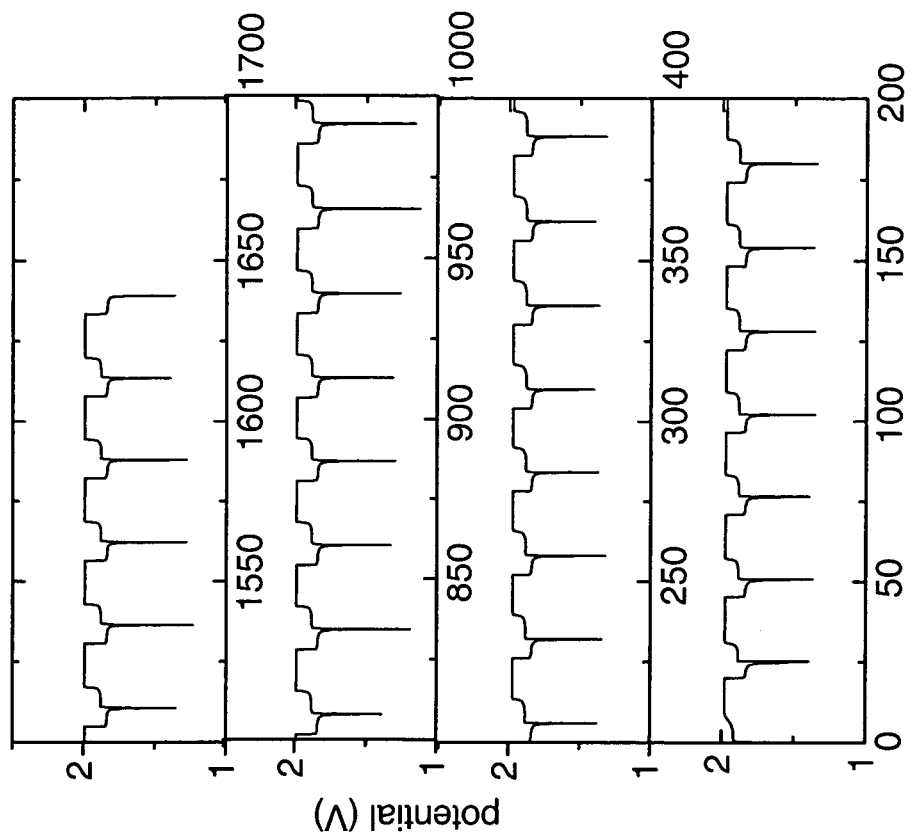
Figure 2A:
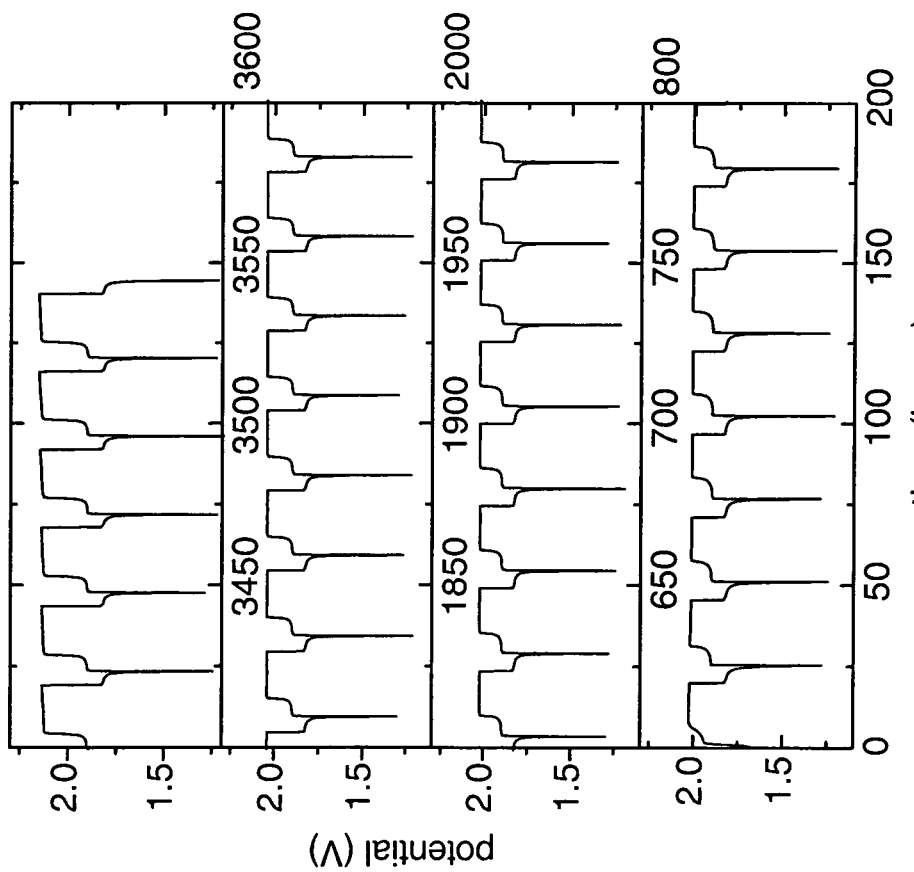
Figures 3A, 3B:
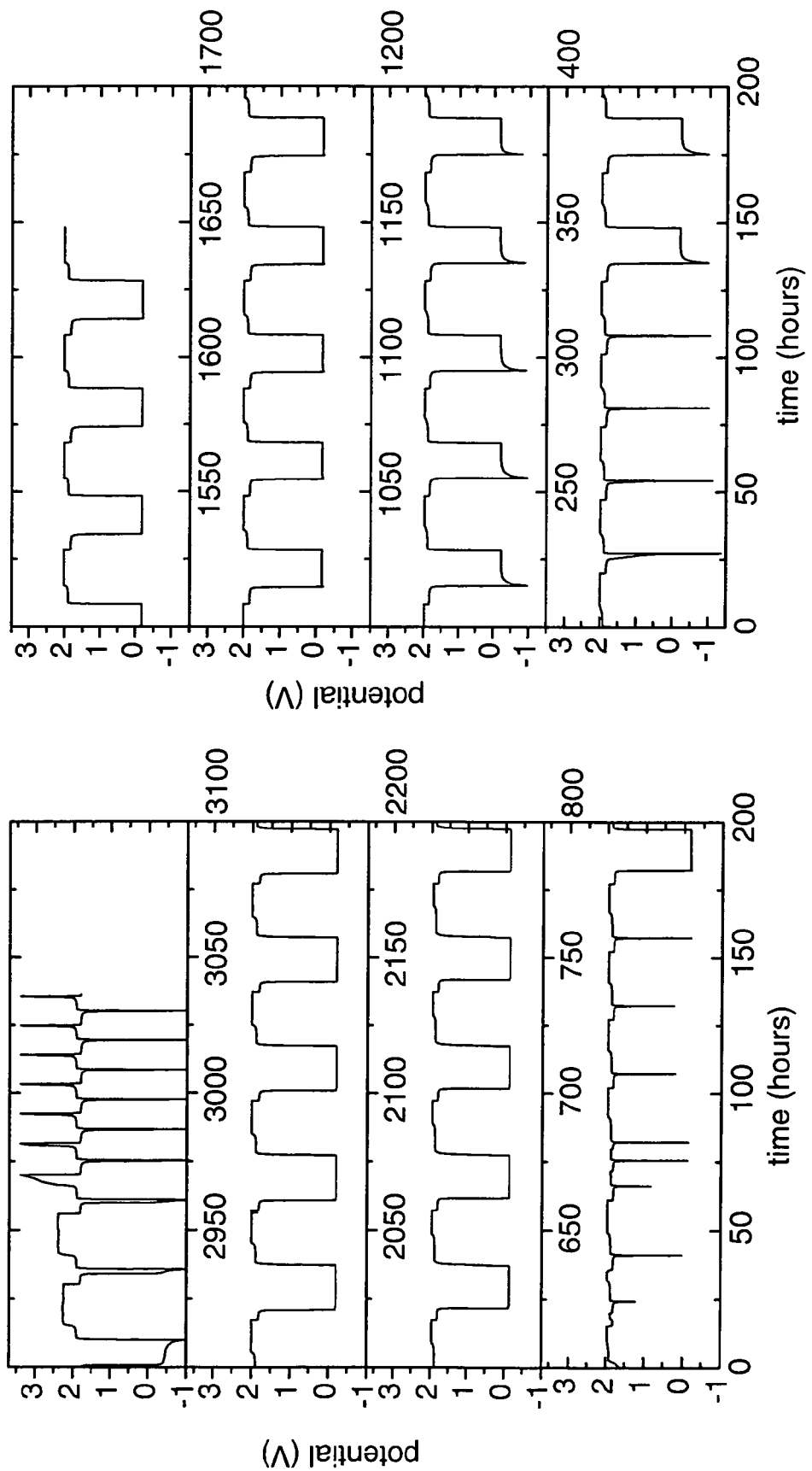
Figure 5A:
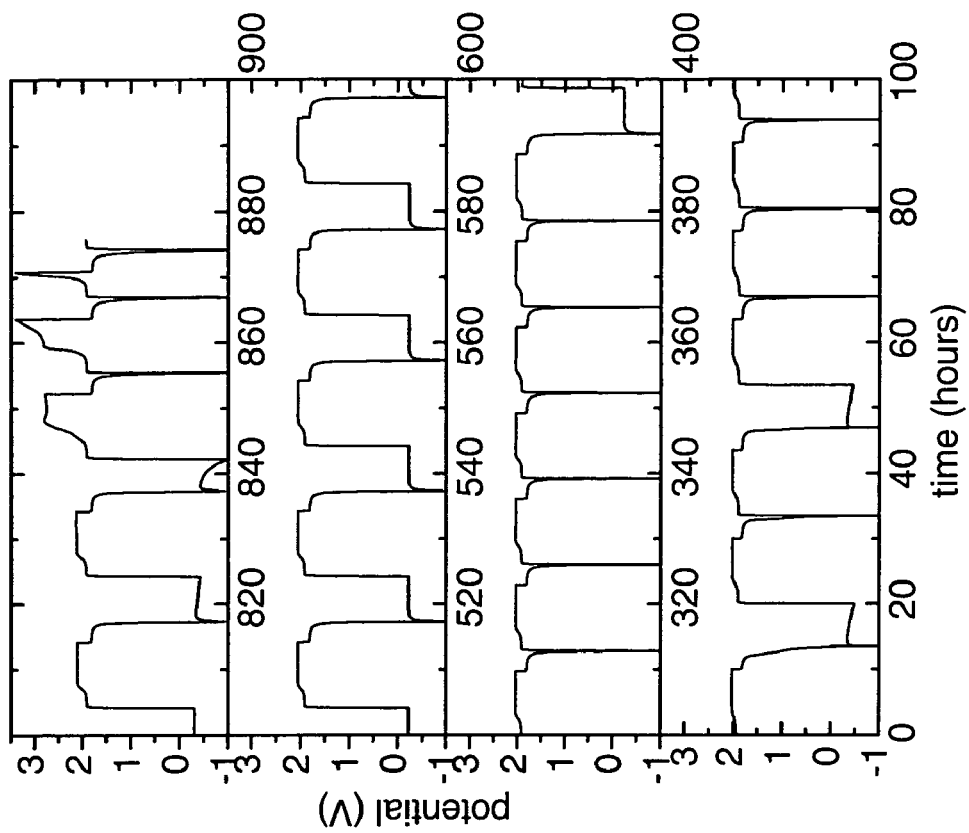
Figure 5B:
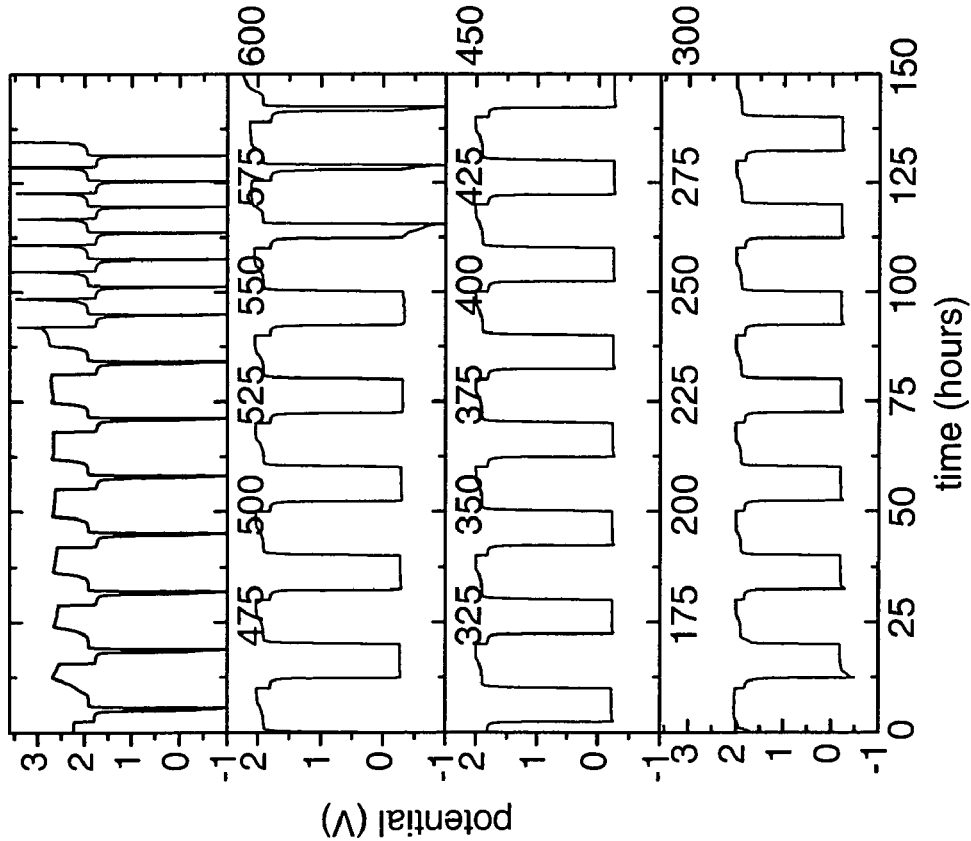
Figure 7B:
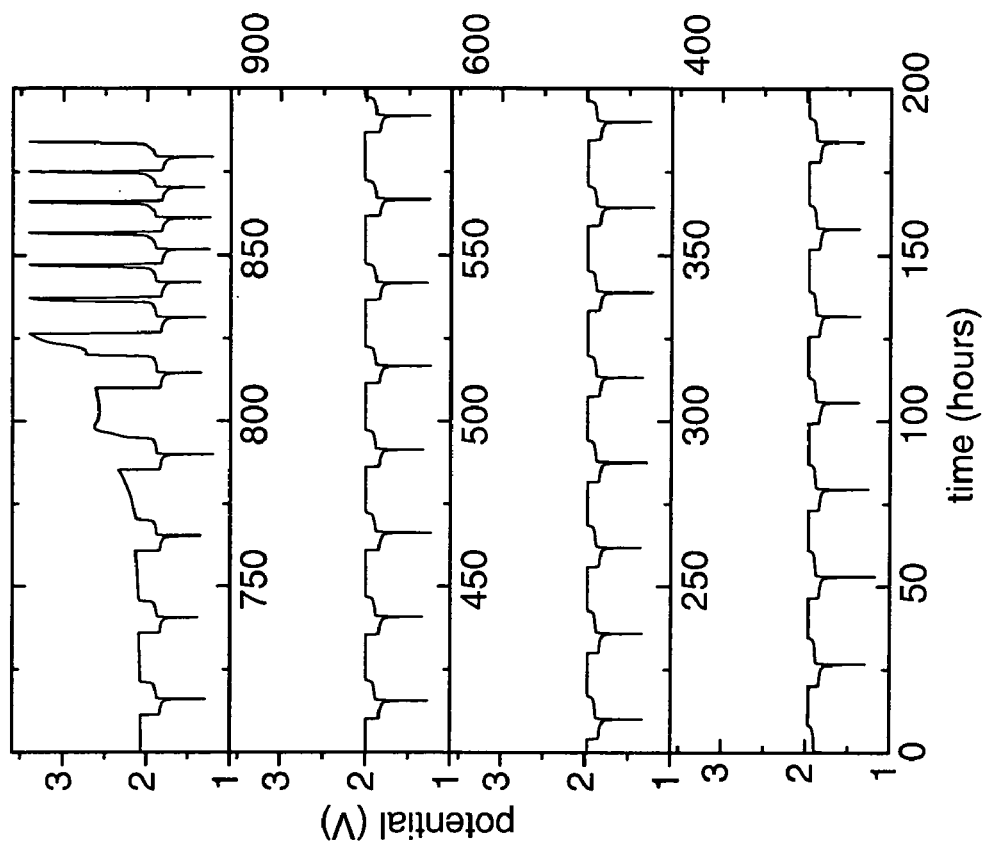
FIG. 7a, FIG. 7b, FIG. 8a, FIG. 8b, FIG. 9a, FIG. 9b and FIG. 10 respectively are plots showing cell potential during successive charge-discharge cycles for four time spans in the Example 2, Run Nos. 2-1 through 2-7 cell charge-discharge tests.
Figure 7A:
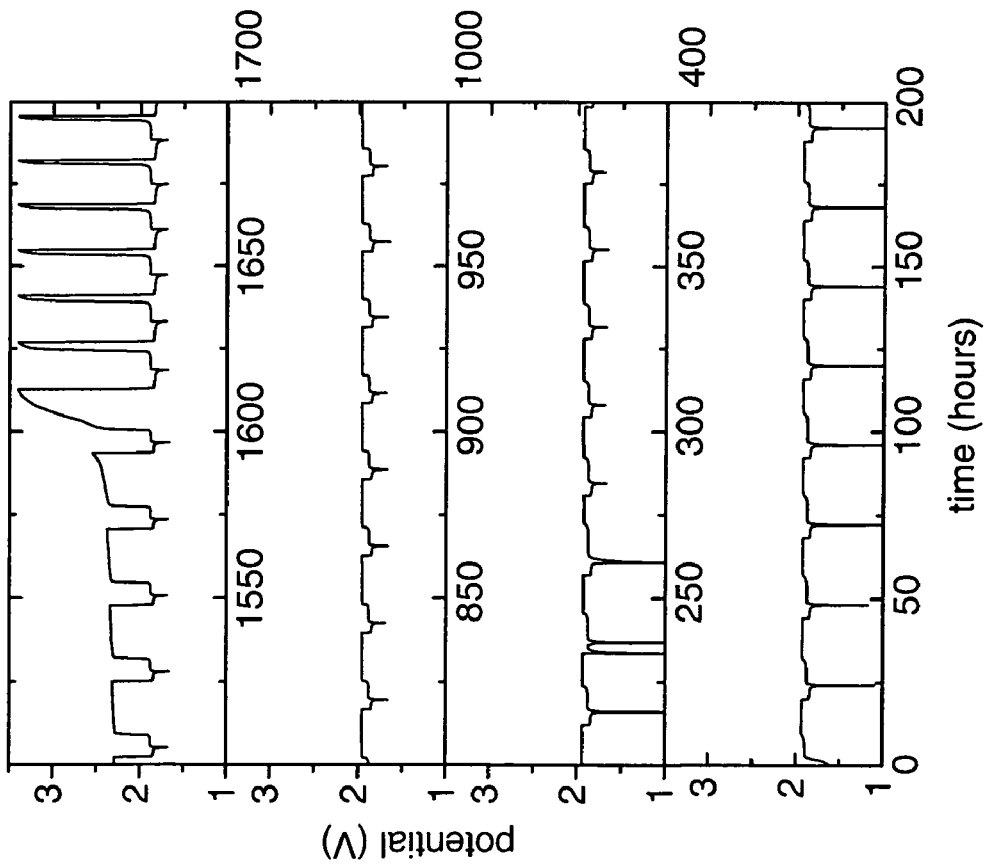
Figure 8B:
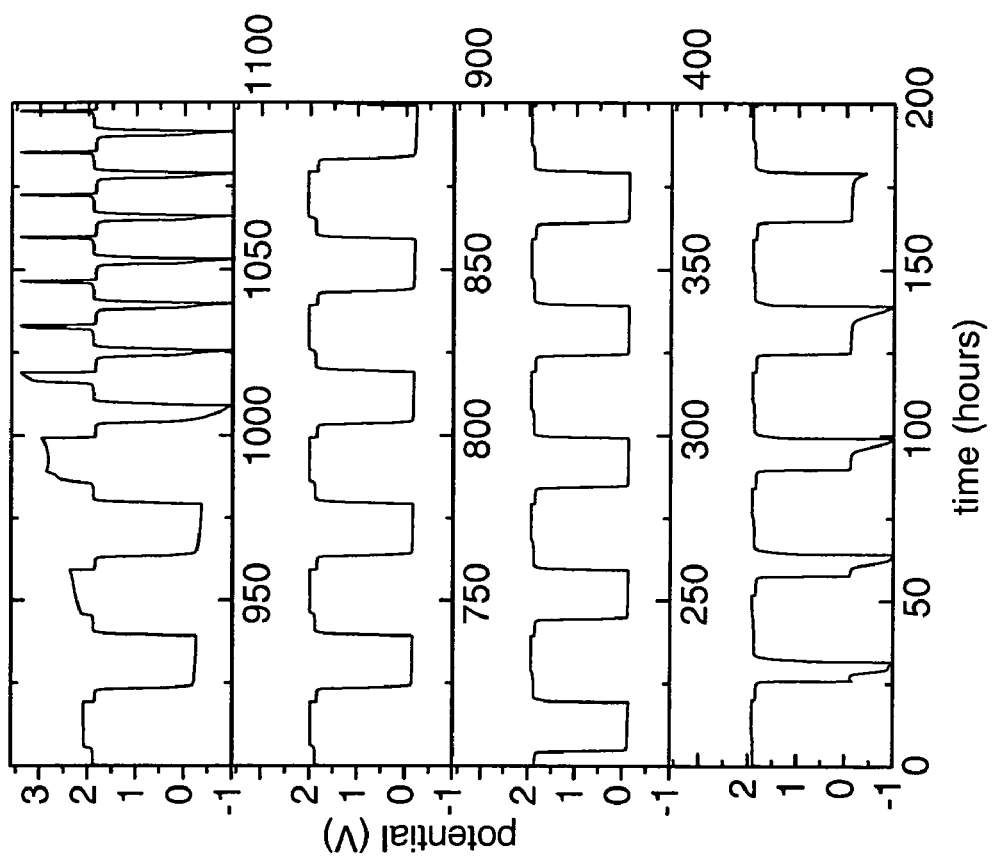
Figure 8A:
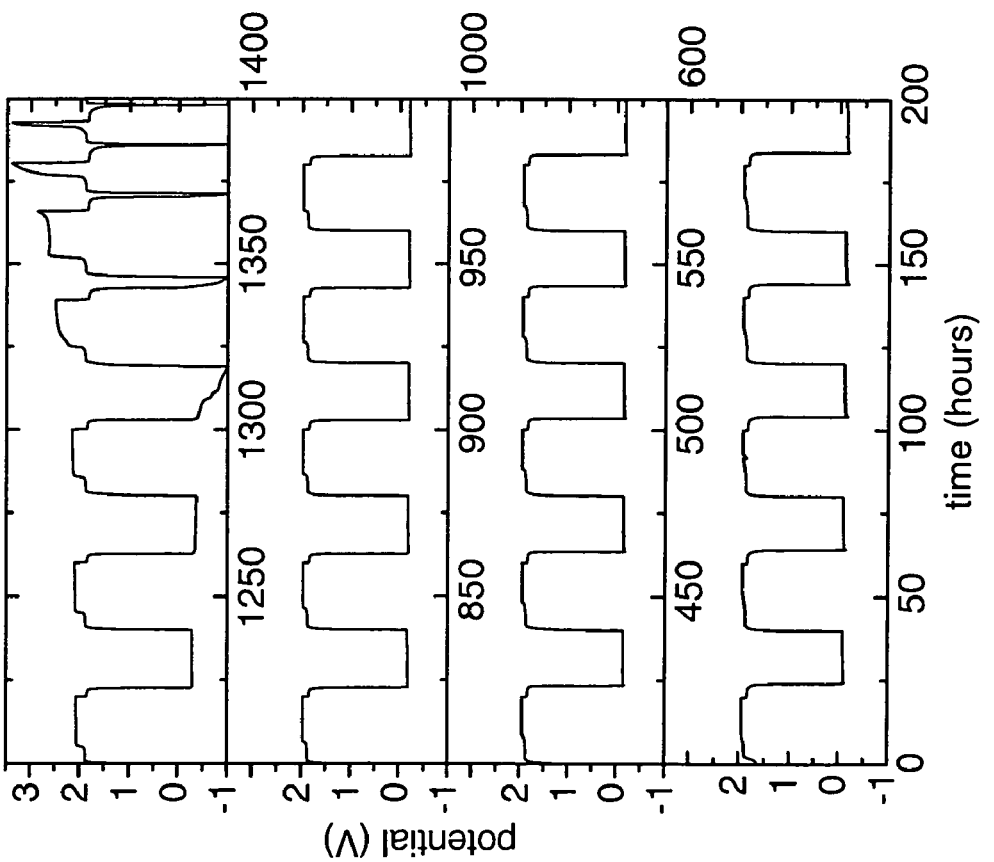

Coin-type test cells were built in 2325 coin cell hardware as described in A. M. Wilson and J. R. Dahn, *J. Electrochem. Soc.*, 142, 326-332 (1995). An exploded perspective schematic view of a 2325 coin cell 10 is shown in FIG. 1. Stainless steel cap 24 and oxidation resistant case 26 enclosed the cell and served as the negative and positive terminals respectively. The negative electrode 14 was formed from $Li_{4/3}Ti_{5/3}O_4$ coated on copper foil current collector 18 as described above. The positive electrode 12 was formed from $LiFePO_4$ coated on aluminum foil current collector 16 as described above. Separator 20 was formed from CELGARD™ No. 2500 microporous material having a 25 micrometer thickness, and wetted with electrolyte. For some cells (noted below), the cell was prepared using two separators placed back-to-back. Gasket 27 provided a seal and separated the two terminals. A tightly squeezed stack was formed when the cell was crimped closed. The cells were assembled in an approximately "balanced" configuration, that is, with the negative electrode capacity equaling the positive electrode capacity.

The assembled cells were cycled at 30° C. using "C/10" (10 hour charge and 10 hour discharge), "C/5" (5 hour charge and 5 hour discharge), "C/2" (2 hour charge and 2 hour discharge) or "C" (1 hour charge and 1 hour discharge) rates using a computer-controlled charge-discharge testing unit produced by E-One/Moli Energy Canada. The negative ($Li_{4/3}Ti_{5/3}O_4$) electrodes had a specific capacity of about 140 mAh/g. The negative electrode capacity was selected to be about 130% of the positive electrode capacity to ensure that during charging followed by overcharging, the positive electrode would be depleted of lithium (and hence reach and pass $E_{cv}$) while the negative electrode remains at its plateau potential of 1.55 V vs $Li/Li^+$. A 140 mA/g specific current could discharge a fully charged cell containing such electrodes in one hour, and would represent a "1C" rate for such cells. These cells were discharged to 1.0 or 1.3 V and were charged to a fixed capacity or until an upper cutoff of 3.40 V was reached. Since $Li_{4/3}Ti_{5/3}O_4$ has a recharged potential near 1.55 V vs. $Li/Li^+$, the 1.0, 1.3 and 2.65 V cell potentials correspond to potentials of about 2.55, 2.85 and 4.95 V vs. $Li/Li^+$.

The shuttle test cell cycling results are shown below in Table 1. A designation such as "142+" in the "Cycles" column indicates that the substituted phenothiazine compound continues to function as a cyclable redox shuttle after 142 cycles and that the charge/discharge test is ongoing. The designation "OC" indicates that charging was carried out for 100% of the elapsed cycle time beyond which the positive electrode was completely depleted of available lithium. The designation "OD" indicates that discharging was carried out for 100% of the elapsed cycle time beyond which the positive electrode was completely filled with available lithium.

TABLE 1

Coin Cell Cycling Performance at 30° C. Using 0.1 M MPT,
LiFePO$_4$ Positive Electrodes and Li$_{4/3}$Ti$_{5/3}$O$_4$ Negative Electrodes

| Run No. | Drawing Figure | Lithium Salt | Separators | Charge/ Discharge Rate | Overcharge (OC)/Overdischarge (OD) | Cycles |
|---|---|---|---|---|---|---|
| 1-1 | 2a | LiBOB | 2 | C/10 | OC | 142+ |
| 1-2 | 2b | LiPF$_6$ | 2 | C/10 | OC | 62+ |
| 1-3 | 3a | LiBOB | 1 | C/10 | OC/OD | 73 OD 76 OC |
| 1-4 | 3b | LiPF$_6$ | 1 | C/10 | OC/OD | 52+ |
| 1-5 | 4a | LiBOB | 2 | C/5 | OC | 153 |
| 1-6 | 4b | LiPF$_6$ | 2 | C/5 | OC | 128 |
| 1-7 | 5a | LiBOB | 2 | C/5 | OC/OD | 21 OD 30 OC |
| 1-8 | 5b | LiPF$_6$ | 2 | C/5 | OC/OD* | 54 |
| 1-9 | 6 | LiBOB | 2 | C/2 | OC/OD | 34 OD 63 OC |
| 1-10 | — | LiPF$_6$ | 1 | C/2 | OC | 134 |
| 1-11 | — | LiPF$_6$ | 1 | C | OC | 133 |

*Overdischarge occurred only occasionally.

The results in Table 1 show that the substituted phenothiazine compound MPT provided overcharge and overdischarge protection in rechargeable lithium-ion cells at a variety of charge and discharge rates. In each run, overcharge and overdischarge protection was obtained without requiring separate control electronics.

EXAMPLE 2

Using the method of Example 1, the assembled cells were cycled at 55° C. using C/10, C/5, C/2, "C 1.5" (1.5 hour charge and 1.5 hour discharge) or C rates. The shuttle test cell cycling results are shown below in Table 2:

TABLE 2

Coin Cell Cycling Performance at 55° C. Using 0.1 M MPT,
LiFePO$_4$ Positive Electrodes and Li$_{4/3}$Ti$_{5/3}$O$_4$ Negative Electrodes

| Run No. | Drawing Figure | Lithium Salt | Separators | Charge/ Discharge Rate | Overcharge (OC)/Overdischarge (OD) | Cycles |
|---|---|---|---|---|---|---|
| 2-1 | 7a | LiBOB | 2 | C/10 | OC | 69 |
| 2-2 | 7b | LiPF$_6$ | 2 | C/10 | OC | 32 |
| 2-3 | 8a | LiBOB | 2 | C/10 | OC/OD | 33 OD 35 OC |
| 2-4 | 8b | LiPF$_6$ | 2 | C/10 | OC/OD | 26 |
| 2-5 | 9a | LiBOB | 2 | C/5 | OC | 97 |
| 2-6 | 9b | LiPF$_6$ | 2 | C/5 | OC | 31 |
| 2-7 | 10 | LiBOB | 2 | C/5 | OC/OD | 21 OC 30 OD |
| 2-8 | 11 | LiBOB | 2 | C | OC | 35 |
| 2-9 | 12 | LiBOB | 2 | C | OC/OD | 13 OD 21 OC |
| 2-10 | 13 | LiBOB | 2 | 1.5 C | OC/OD | 22 OD 48 OC |
| 2-11 | — | LiPF$_6$ | 1 | C/2 | OC | 44+ |
| 2-12 | — | LiPF$_6$ | 1 | C/2 | OC/OD | 26 OD 19 OC |
| 2-13 | — | LiPF$_6$ | 1 | C | OC/OD | 13 OD 2 OD |

The results in Table 2 show that MPT provided overcharge and overdischarge protection in rechargeable lithium-ion cells at an elevated temperature and a variety of charge and discharge rates.

EXAMPLE 3

Using the general method of Example 1, coin-type test cells were prepared using 100 parts of mesocarbon microbeads ("MCMB", a graphitic carbon with 3.45>d$_{002}$>3.354 Å, obtained from E-One/Moli Energy Canada, Maple Ridge, B.C., Canada) in the negative electrode slurry in place of the Li$_{4/3}$Ti$_{5/3}$O$_4$ negative electrode material employed in Example 1. The MCMB slurry was coated onto a copper foil current collector to prepare negative electrodes having a specific capacity of about 300 mAh/g. Thus a 300 mA/g specific current could discharge a fully charged cell containing such electrodes in one hour. Cells made using these MCMB negative electrodes and 140 mAh/g LiFePO$_4$ positive electrodes were charged and discharged using C-rates based on the positive electrode capacity. Because the MCMB negative electrode had more than twice the capacity of the LiFePO$_4$ positive electrode, C-rates referenced to the negative electrode capacity would be less than one-half as large as those referenced to the positive electrode capacity. The cells were discharged to 2.5 V and charged to a fixed capacity or until an upper cutoff of 4.9 V was reached. In these cells the MCMB negative electrode reaches about 0.07 V vs. Li/Li$^+$ when the LiFePO$_4$ positive electrode becomes fully charged and thus the cutoff potential vs. MCMB is approximately 4.9 V vs. MCMB or 4.97 V vs. Li/Li$^+$. The shuttle test cell cycling results are shown below in Table 3.

TABLE 3

Coin Cell Cycling Performance at 30° C. Using 0.1 M MPT,
LiFePO$_4$ Positive Electrodes and MCMB Negative Electrodes

| Run No. | Drawing Figure | Lithium Salt | Separators | Charge/ Discharge Rate | Overcharge (OC)/Overdischarge (OD) | Cycles |
|---|---|---|---|---|---|---|
| 3-1 | 14a | 0.7 M LiBOB | 1 | C/10 | OC | 13 |
| 3-2 | 14b | 0.5 M LiPF$_6$ | 2 | C/10 | OC | 56 |

The results in Table 3 show that MPT provided overcharge and overdischarge protection in rechargeable lithium-ion cells containing MCMB negative electrodes.

EXAMPLE 4

Using the general methods of Example 1 and Example 3, coin-type test cells were prepared using Li$_{4/3}$Ti$_{5/3}$O$_4$ or MCMB negative electrodes, and 10-acetyl-phenothiazine (APT) in place of MPT. The shuttle test cell cycling results are shown below in Table 4.

TABLE 4

Coin Cell Cycling Performance at 30° C. Using 0.1 M APT, LiFePO$_4$ Positive Electrodes and Li$_{4/3}$Ti$_{5/3}$O$_4$ or MCMB Negative Electrodes

| Run No. | Drawing Figure | Negative Electrode | Lithium Salt | Separators | Charge/Discharge Rate | Overcharge (OC)/Overdischarge (OD) | Cycles |
|---|---|---|---|---|---|---|---|
| 4-1 | 15a | Li$_{4/3}$Ti$_{5/3}$O$_4$ | 0.7 M LiBOB | 2 | C/10 | OC | 114 |
| 4-2 | 15b | Li$_{4/3}$Ti$_{5/3}$O$_4$ | 0.5 M LiPF$_6$ | 2 | C/10 | OC | 13 |
| 4-3 | 16 | Li$_{4/3}$Ti$_{5/3}$O$_4$ | 0.5 M LiBOB | 2 | C/10 | OC/OD | 6* |
| 4-4 | 17a | Li$_{4/3}$Ti$_{5/3}$O$_4$ | 0.5 M LiBOB | 2 | C/5 | OC | 108 |
| 4-5 | 17b | Li$_{4/3}$Ti$_{5/3}$O$_4$ | 0.5 M LiPF$_6$ | 2 | C/5 | OC | 9 |
| 4-6 | 18 | Li$_{4/3}$Ti$_{5/3}$O$_4$ | 0.5 M LiBOB | 2 | C/5 | OC/OD | 49 no OD |
| 4-7 | 19 | Li$_{4/3}$Ti$_{5/3}$O$_4$ | 0.5 M LiBOB | 2 | C/2 | OC | 32 |
| 4-8 | 20a | Li$_{4/3}$Ti$_{5/3}$O$_4$ | 0.5 M LiBOB | 2 | C/2 | OC/OD | 83 no OD |
| 4-9 | 20b | Li$_{4/3}$Ti$_{5/3}$O$_4$ | 0.5 M LiPF$_6$ | 2 | C/2 | OC/OD | 4 no OD |
| 4-10 | 21a | MCMB | 0.7 M LiBOB | 1 | C/10 | OC | 1 |
| 4-11 | 21b | MCMB | 0.5 M LiPF$_6$ | 2 | C/10 | OC | 7 |
| 4-12 | 22 | MCMB | 0.5 M LiPF$_6$ | 2 | C/5 | OC | 6 |
| 4-13 | 23 | MCMB | 0.5 M LiPF$_6$ | 2 | C/2 | OC | 14 |

*Second cycle included a 100 hour overcharge period.

The results in Table 4 show that APT provided overcharge and overdischarge protection in rechargeable lithium-ion cells containing Li$_{4/3}$Ti$_{5/3}$O$_4$ and MCMB negative electrodes at a variety of charge and discharge rates. In Run Nos. 4-6, 4-8 and 4-9 the cells were cycled under conditions intended to overcharge and overdischarge the cells but overdischarge was not observed.

EXAMPLE 5

Using the general methods of Example 1 and Example 3, coin-type test cells were prepared using Li$_{4/3}$Ti$_{5/3}$O$_4$ or MCMB negative electrodes, 0.7 M LiBOB, a single separator and a variety of substituted phenothiazine compounds in place of MPT. The shuttle test cells were cycled at a C/10 rate to overcharge. The cycling results are shown below in Table 5.

TABLE 5

Coin Cell Cycling Performance at 30° C. Using Various Substituted Phenothiazines, LiFePO$_4$ Positive Electrodes and Li$_{4/3}$Ti$_{5/3}$O$_4$ or MCMB Negative Electrodes

| Run No. | Drawing Figure | Substituted Phenothiazine Compound | Negative Electrode | Cycles |
|---|---|---|---|---|
| 5-1 | 24 | 2-(trifluoromethyl)-phenothiazine | Li$_{4/3}$Ti$_{5/3}$O$_4$ | 12 |
| 5-2 | 25a | 10-ethyl-phenothiazine (EPT) | Li$_{4/3}$Ti$_{5/3}$O$_4$ | 109+ |
| 5-3 | 25b | 10-ethyl-phenothiazine (EPT) | MCMB | 18 |
| 5-4 | 26a | 3-chloro-10-ethyl-phenothiazine (3-chloro-EPT) | Li$_{4/3}$Ti$_{5/3}$O$_4$ | 118+ |
| 5-5 | 26b | 3-chloro-10-ethyl-phenothiazine (3-chloro-EPT) | MCMB | 32 |
| 5-6 | 27a | 10-isopropyl-phenothiazine (IPT) | Li$_{4/3}$Ti$_{5/3}$O$_4$ | 114+ |
| 5-7 | 27b | 10-isopropyl-phenothiazine (IPT) | MCMB | 7 |

The results in Table 5 show that electrolyte solutions containing 0.1 M 2-(trifluoromethyl)-phenothiazine, 10-ethyl-phenothiazine (EPT), 3-chloro-10-ethyl-phenothiazine (3-chloro-EPT) or 10-isopropyl-phenothiazine (IPT) all successfully protected rechargeable lithium-ion cells from overcharge.

COMPARATIVE EXAMPLE 1

Figure 28:
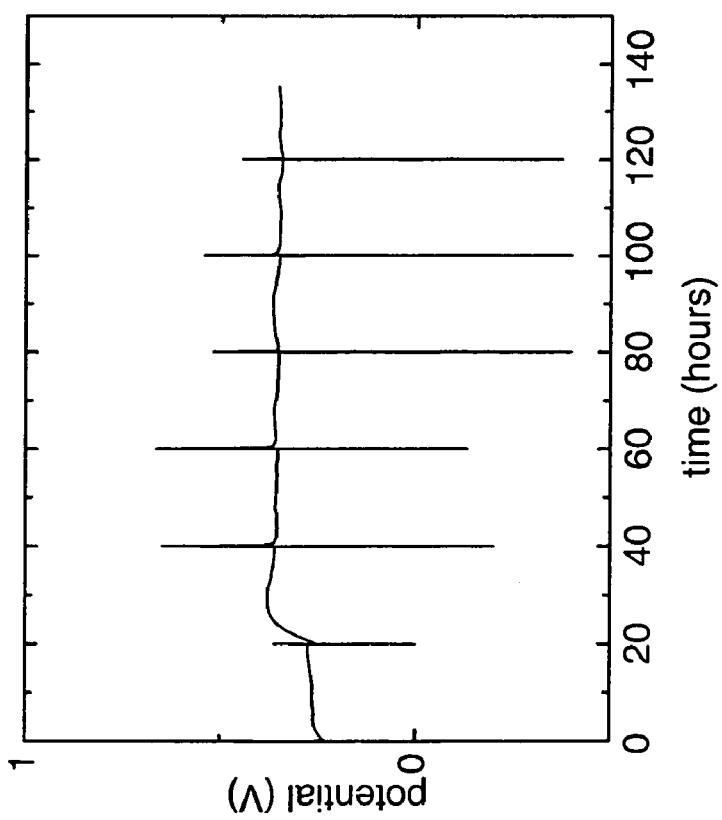
FIG. 28 is a plot showing cell potential during successive charge-discharge cycles for the Comparative Example 1 cell charge-discharge test.
Figure 9A:
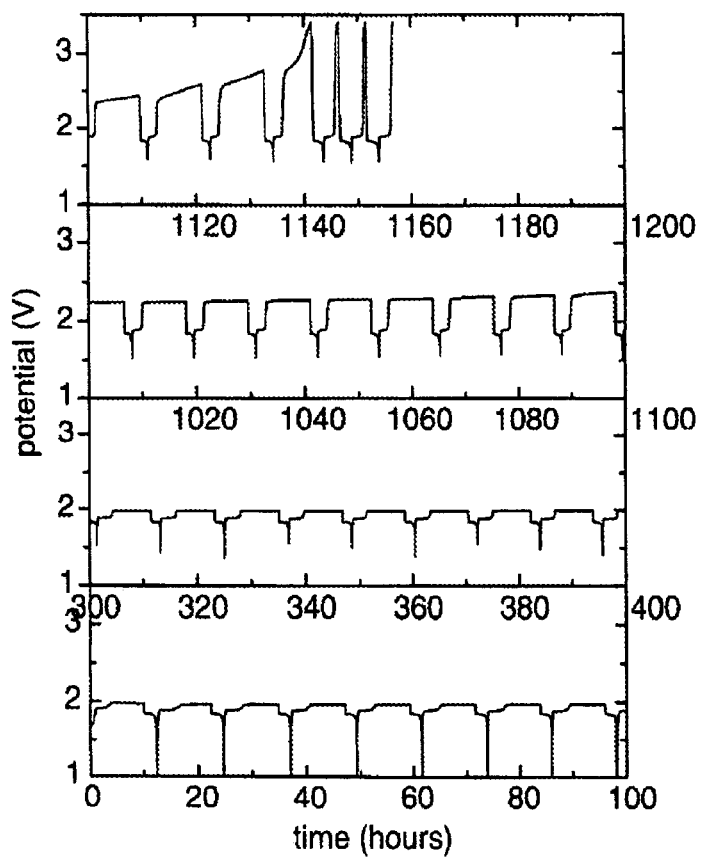

Using the method of Example 1, a coin-type test cell was prepared using a Li$_{4/3}$Ti$_{5/3}$O$_4$ negative electrode, LiFePO$_4$ positive electrode, 0.7 M LiBOB, a single separator and phenothiazine in place of MPT. The cell was cycled at a C/10 rate to overcharge. The cycling results are shown in FIG. 28. As shown in FIG. 28, phenothiazine did not provide overcharge protection for the LiCoO$_2$ positive electrode, and prevented the cell from becoming fully charged.

COMPARATIVE EXAMPLE 2

Figure 29:
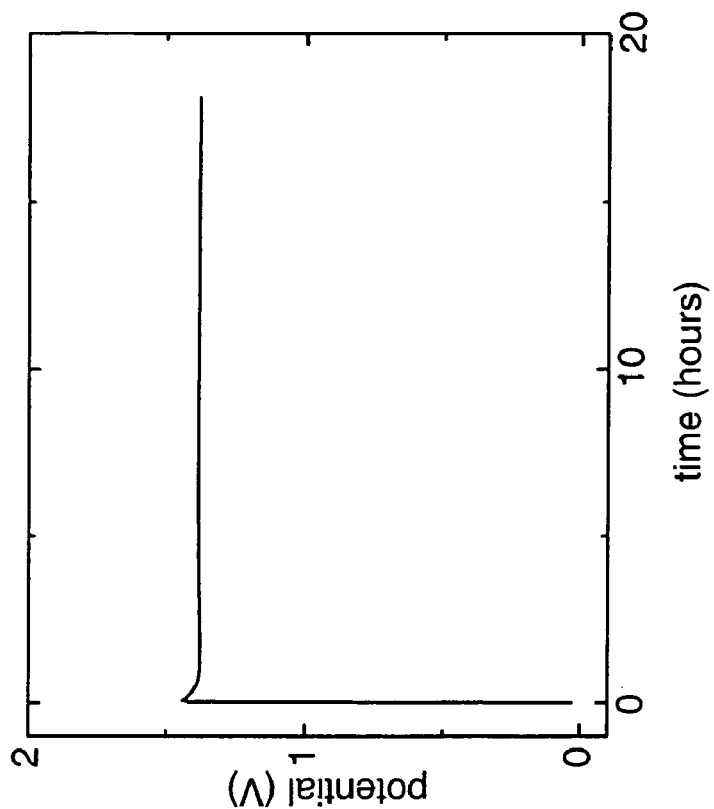
FIG. 29 is a plot showing cell potential for the Comparative Example 2 cell charge test.

Using the method of Example 1, a coin-type test cell was constructed using an LiCoO$_2$ positive electrode and containing 0.1 M MPT dissolved in the electrolyte. LiCoO$_2$ has a recharged potential of about 4.1 V vs. Li/Li$^+$, a value greater than the MPT oxidation potential ($E_{obs}$ 3.47 V vs. Li/Li$^+$). The cell was charged at a C/10 rate. The results are shown in FIG. 29. As shown in FIG. 29, MPT did not provide overcharge protection for the LiCoO$_2$ positive electrode, and prevented the cell from becoming fully charged by shuttling below the recharged potential of the positive electrode.

A number of embodiments of the invention have been described. Nevertheless, it will be understood that various modifications may be made without departing from the spirit and scope of the invention. Accordingly, other embodiments are within the scope of the following claims.

We claim:
1. A rechargeable lithium-ion cell comprising:
    (a) a positive electrode having a recharged potential and comprising LiFePO$_4$, Li$_2$FeSiO$_4$, Li$_x$MnO$_2$ (where x is about 0.3 to about 0.4), or MnO$_2$;
    (b) a negative electrode;
    (c) a charge-carrying electrolyte comprising a charge carrying medium comprising a charge carrying medium that includes an organic carbonate and a lithium salt; and
    (d) a cyclable redox chemical shuttle comprising 10-methyl-phenothiazine, 10-ethyl-phenothiazine, 3-chloro-10-ethyl-phenothiazine, 10-isopropyl-phenothiazine, 2-perfluoromethyl-phenothiazine, 10-acetyl-phenothiazine 2-cyano-10-perfluoromethylsulfonyl-phenothiazine, 2-methoxy-10-perfluoromethylsulfonyl-phenothiazine, 2-perfluoromethyl-10-perfluoromethylsulfonyl-phenothiazine, 10-perfluoromethyl-phenothiazine,

10-perfluoromethylsulfonyl-phenothiazine, 10-(1,1,1,2,3,3)-hexafluoropropyl-phenothiazine, or mixtures thereof, wherein
the recharged potential is the potential at which the positive electrode becomes delithiated during the first charge cycle to a lithium level corresponding to at least 90% of the available recharged cell capacity.

2. A cell according to claim 1 wherein the chemical redox shuttle is substituted at its nitrogen atom.

3. A cell according to claim 1 wherein the chemical redox shuttle is substituted at one or more ring carbon atoms.

4. A cell according to claim 3 wherein the chemical redox shuttle is 2-perfluoromethyl-phenothiazine.

5. A cell according to claim 1 wherein the chemical redox shuttle is substituted with one or more alkyl groups containing 1 to about 4 carbon atoms.

6. A cell according to claim 1 wherein the chemical redox shuttle comprises 10-methyl-phenothiazine, 10-ethyl-phenothiazine, 3-chloro-10-ethyl-phenothiazine, 10-isopropyl-phenothiazine, 10-acetyl-phenothiazine, or mixtures thereof.

7. A cell according to claim 1 wherein the chemical redox shuttle comprises 2-cyano-10-perfluoromethylsulfonyl-phenothiazine, 2-methoxy-10-perfluoromethylsulfonyl-phenothiazine, 2-perfluoromethyl-10-perfluoromethylsulfonyl-phenothiazine, 10-perfluoromethyl-phenothiazine, 10-perfluoromethylsulfonyl-phenothiazine, 10-(1,1,1,2,3,3)-hexafluoropropyl-phenothiazine, or mixtures thereof.

8. A cell according to claim 1 wherein the cyclable redox chemical shuttle is present in the electrolyte in an amount of from 0.1M to about 0.3M.

9. A cell according to claim 1 wherein the electrolyte comprises a cosolvent.

10. A cell according to claim 1 wherein the chemical redox shuttle has an oxidation potential from about 0.3 V to about 5 V above the recharged potential of the positive electrode.

11. A cell according to claim 1 wherein the chemical redox shuttle has an oxidation potential from about 0.3 to about 0.6 V above the recharged potential of the positive electrode.

12. A cell according to claim 1 wherein the chemical redox shuttle provides overcharge protection after at least 30 charge-discharge cycles at a charging voltage sufficient to oxidize the phenothiazine compound and at an overcharge charge flow equivalent to 100% of the cell capacity during each cycle.

13. A cell according to claim 1 wherein the chemical redox shuttle provides overcharge protection after at least 80 charge-discharge cycles at a charging voltage sufficient to oxidize the phenothiazine compound and at an overcharge charge flow equivalent to 100% of the cell capacity during each cycle.

14. A cell according to claim 1 wherein the negative electrode comprises graphitic carbon, lithium metal, or a lithium alloy.

15. A cell according to claim 1 wherein the charge carrying medium comprises ethylene carbonate, propylene carbonate, dimethyl carbonate, diethyl carbonate, or combinations thereof.

16. A rechargeable lithium-ion cell comprising:
(a) a positive electrode having a recharged potential and comprising $LiFePO_4$, $Li_2FeSiO_4$, $Li_xMnO_2$ (where x is about 0.3 to about 0.4) or $MnO_2$;
(b) a negative electrode comprising graphitic carbon, lithium metal or a lithium alloy; and
(c) a charge-carrying electrolyte comprising:
(i) a charge-carrying media comprising ethylene carbonate, propylene carbonate, dimethyl carbonate, diethyl carbonate or combination thereof;
(ii) a lithium salt comprising $LiPF_6$, lithium bis(oxalato) borate, or combination thereof; and
(iii) a cyclable redox chemical shuttle comprising 10-methyl-phenothiazine, 10-ethyl-phenothiazine, 3-chloro-10-ethyl-phenothiazine, 10-acetyl-phenothiazine, or mixtures thereof dissolved in the electrolyte and having an oxidation potential above the recharged potential of the positive electrode.

17. A method for manufacturing a rechargeable lithium-ion sealed cell comprising the steps of assembling in any order and enclosing in a suitable case:
(a) a positive electrode having a recharged potential and comprising $LiFePO_4$, $Li_2FeSiO_4$, $Li_xMnO_2$ (where x is about 0.3 to about 0.4), or $MnO_2$;
(b) a negative electrode;
(c) a charge-carrying electrolyte comprising charge carrying medium and lithium salt; and
(d) a cyclable redox chemical shuttle comprising 10-methyl-phenothiazine, 10-ethyl-phenothiazine, 3-chloro-10-ethyl-phenothiazine, 10-isopropyl-phenothiazine, 2-perfluoromethyl-phenothiazine, 10-acetyl-phenothiazine 2-cyano-10-perfluoromethylsulfonyl-phenothiazine, 2-methoxy-10-perfluoromethylsulfonyl-phenothiazine, 2-perfluoromethyl-10-perfluoromethylsulfonyl-phenothiazine, 10-perfluoromethyl-phenothiazine, 10-perfluoromethylsulfonyl-phenothiazine, 10-(1,1,1,2,3,3)-hexafluoropropyl-phenothiazine, or mixtures thereof, wherein
the recharged potential is the potential at which the positive electrode becomes delithiated during the first charge cycle to a lithium level corresponding to at least 90% of the available recharged cell capacity.

* * * * *

UNITED STATES PATENT AND TRADEMARK OFFICE
CERTIFICATE OF CORRECTION

| | | |
|---|---|---|
| PATENT NO. | : 7,615,312 B2 | Page 1 of 1 |
| APPLICATION NO. | : 11/130850 | |
| DATED | : November 10, 2009 | |
| INVENTOR(S) | : Dahn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

Page 1 of 2

PATENT NO. : 7,615,312 B2
APPLICATION NO. : 11/130850
DATED : November 10, 2009
INVENTOR(S) : Dahn et al.

Figure 9B:
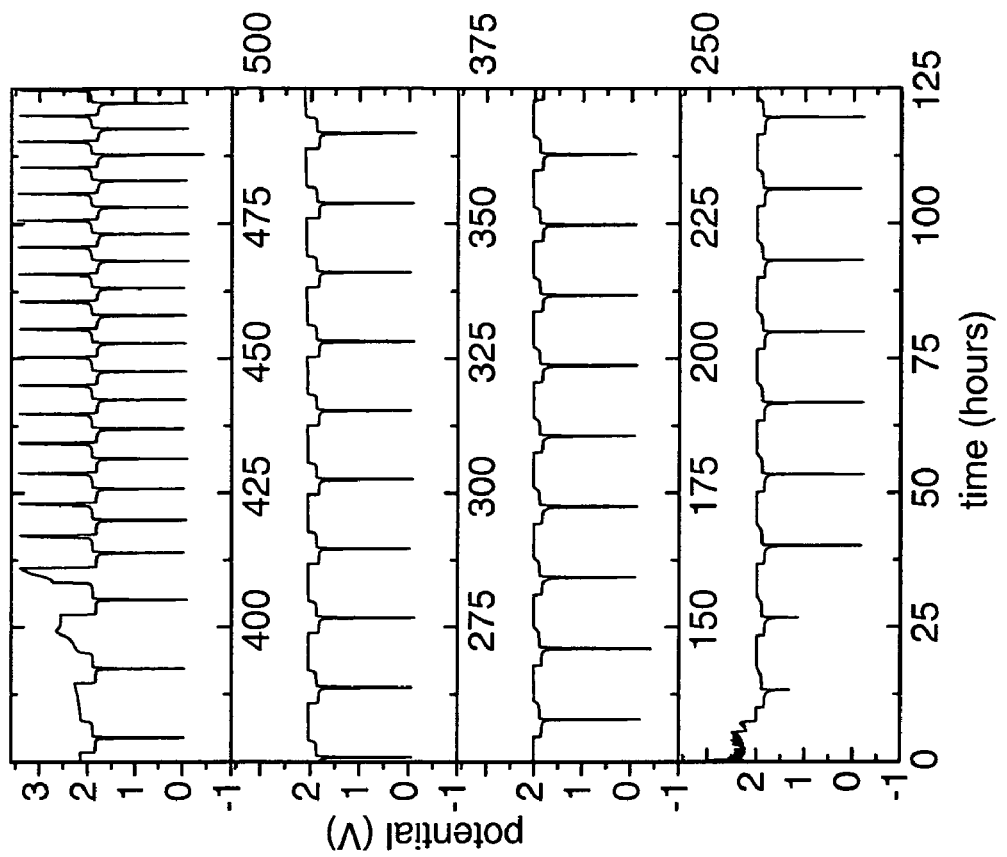
Figure 9A:
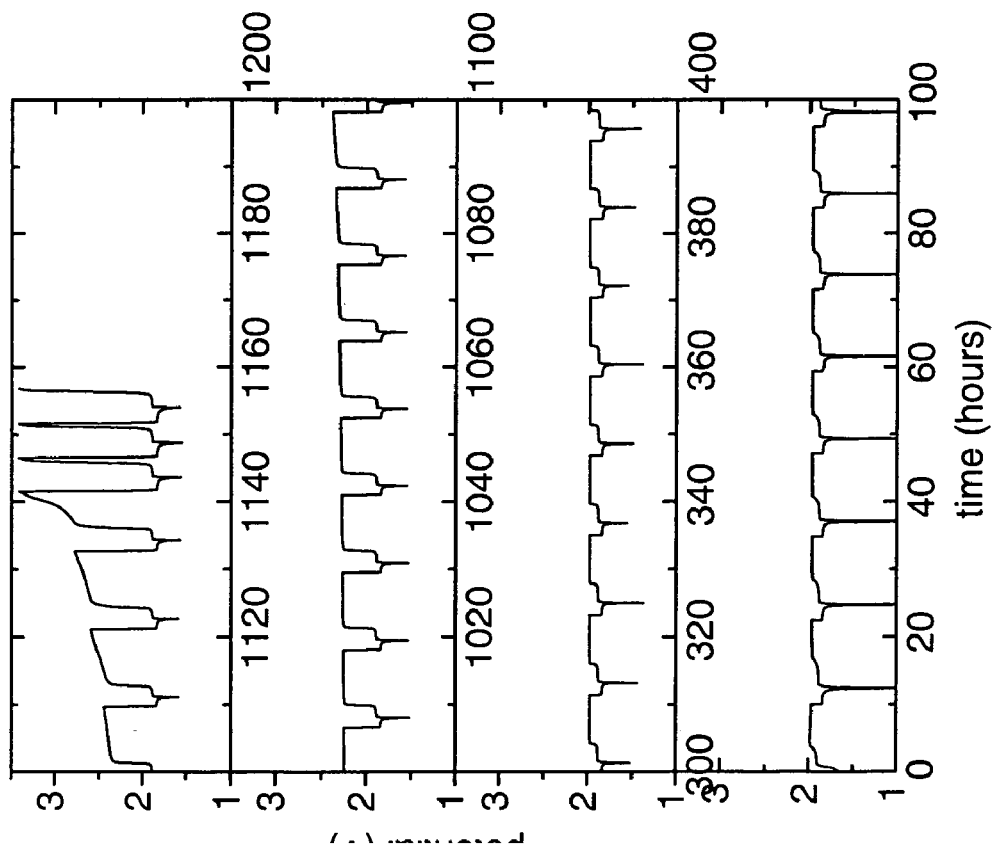
Figure 11:
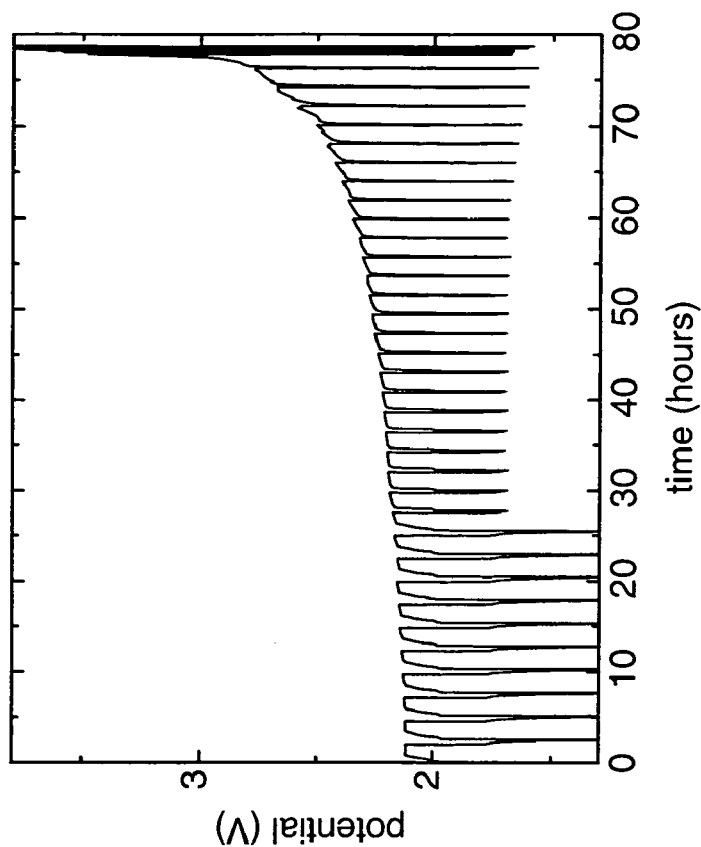
FIG. 11 and FIG. 12 respectively are plots showing cell potential during successive charge-discharge cycles for the Example 2, Run Nos. 2-8 and 2-9 cell charge-discharge tests.
Figure 10:
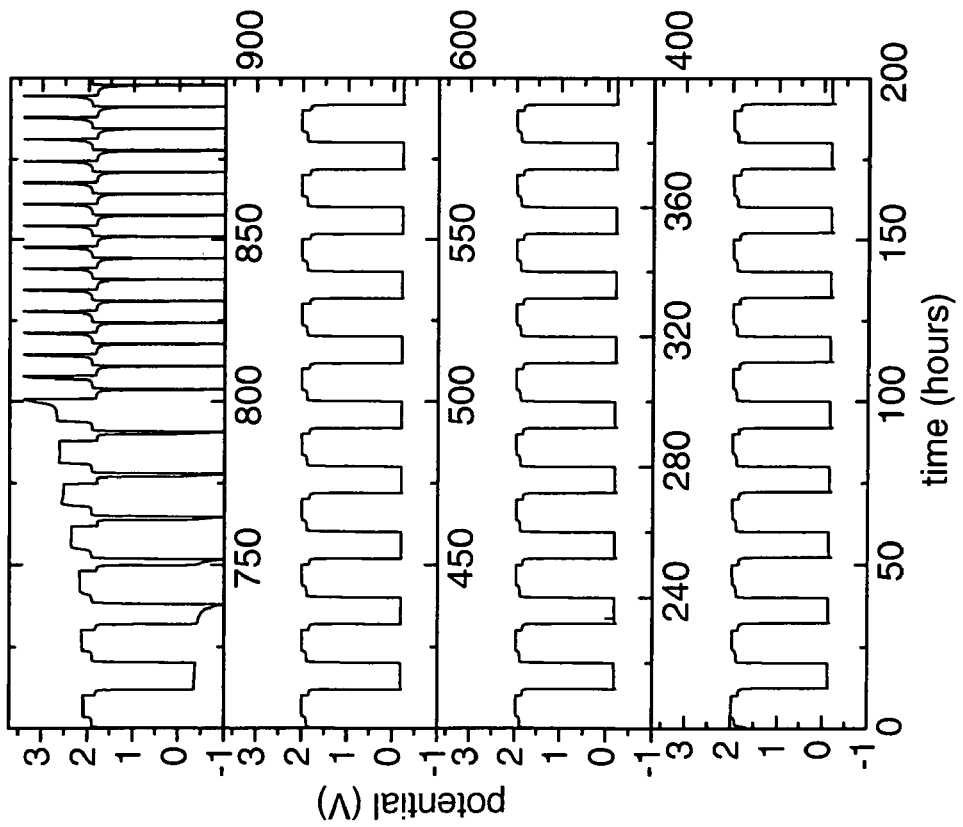
Figure 13:
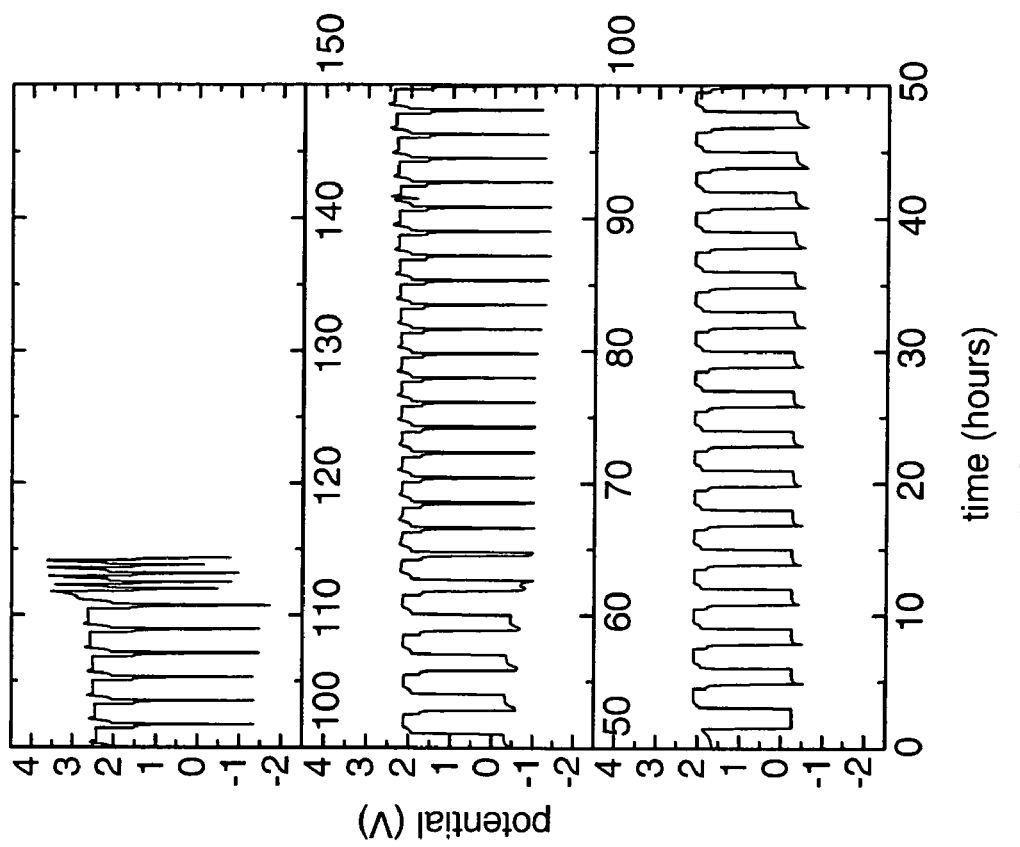
FIG. 13 is a plot showing cell potential during successive charge-discharge cycles for three time spans in the Example 2, Run No. 2-10 cell charge-discharge test.
Figure 12:
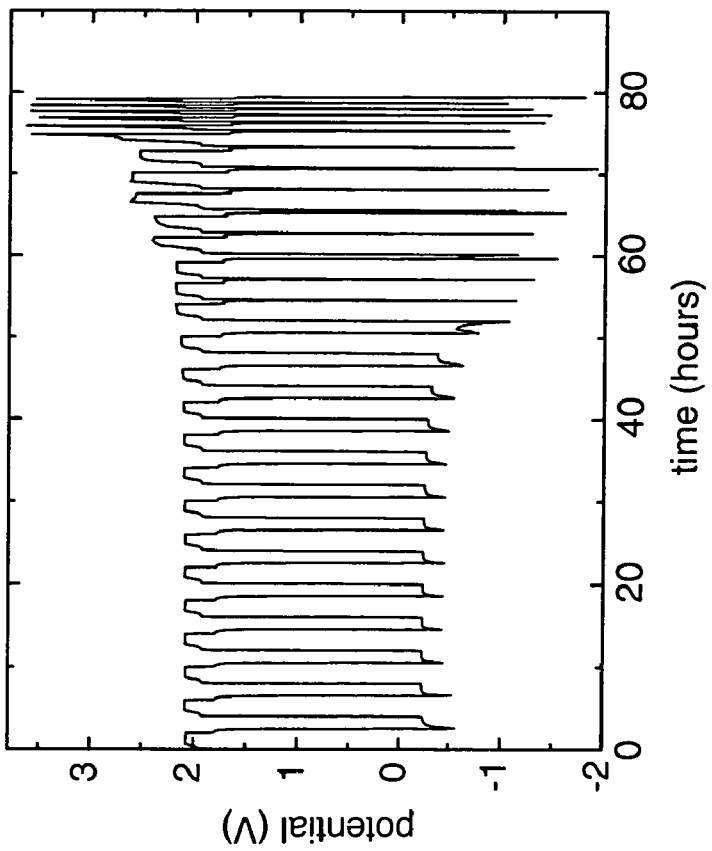
Figure 14B:
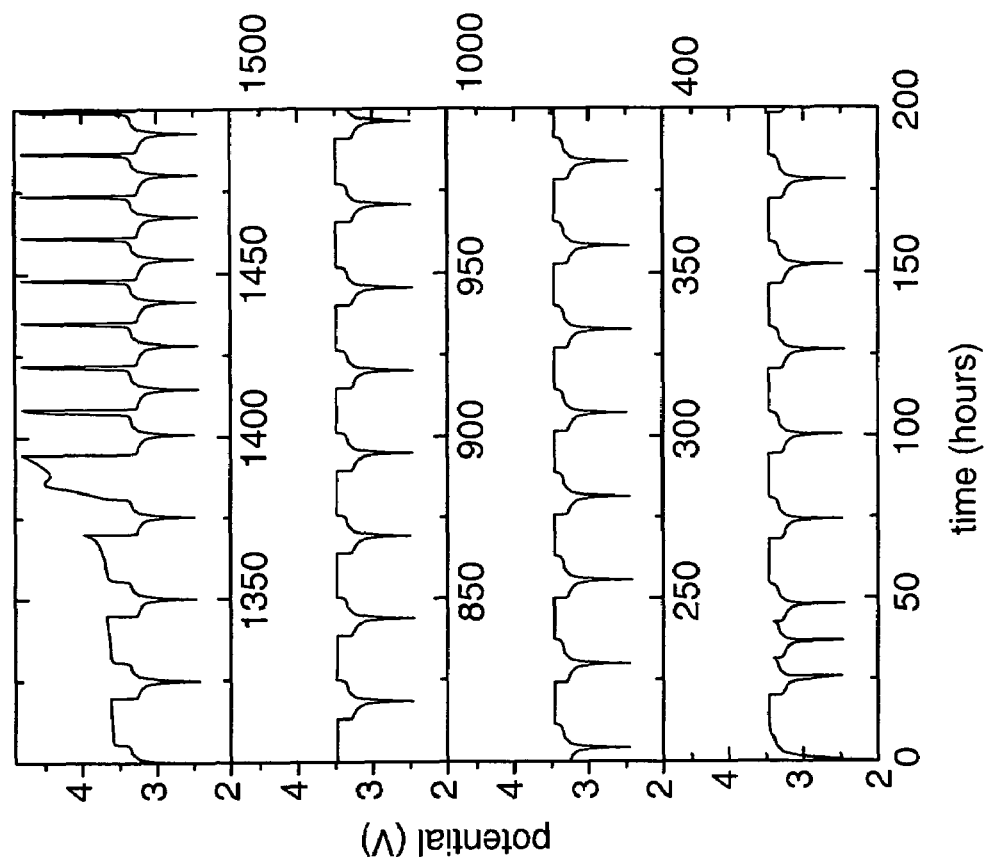
FIG. 14a and FIG. 14b respectively are plots showing cell potential during successive charge-discharge cycles for four time spans in the Example 3, Run Nos. 3-1 and 3-2 cell charge-discharge tests.
Figure 14A:
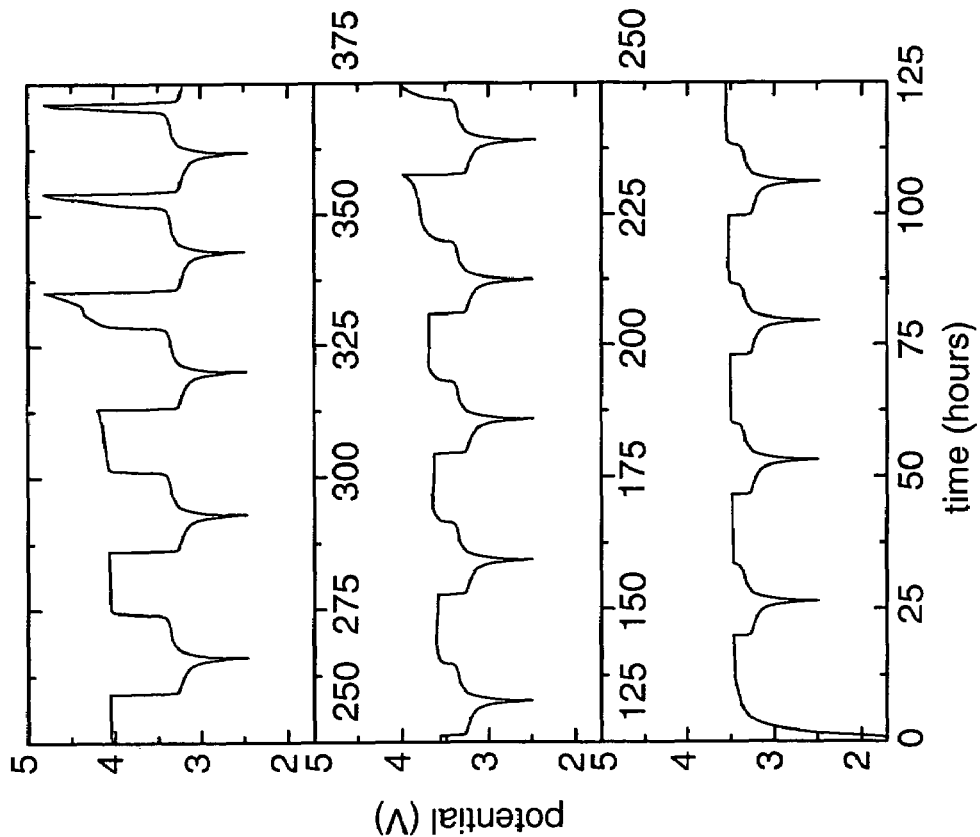
Figure 18:
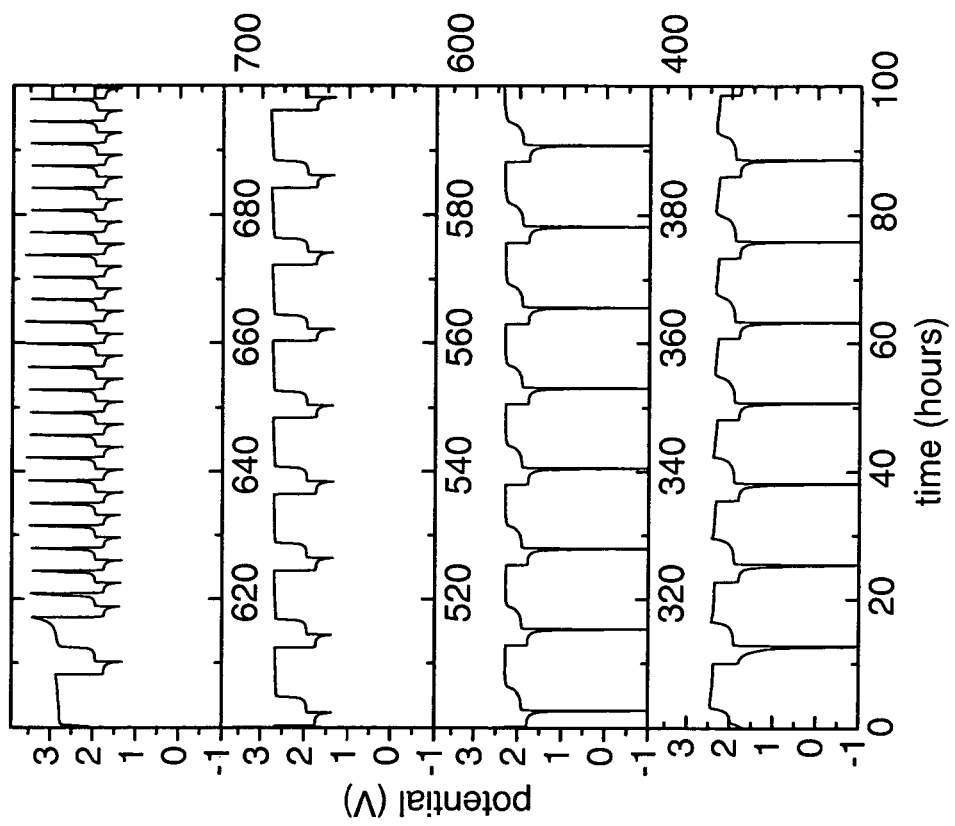
Figure 16:
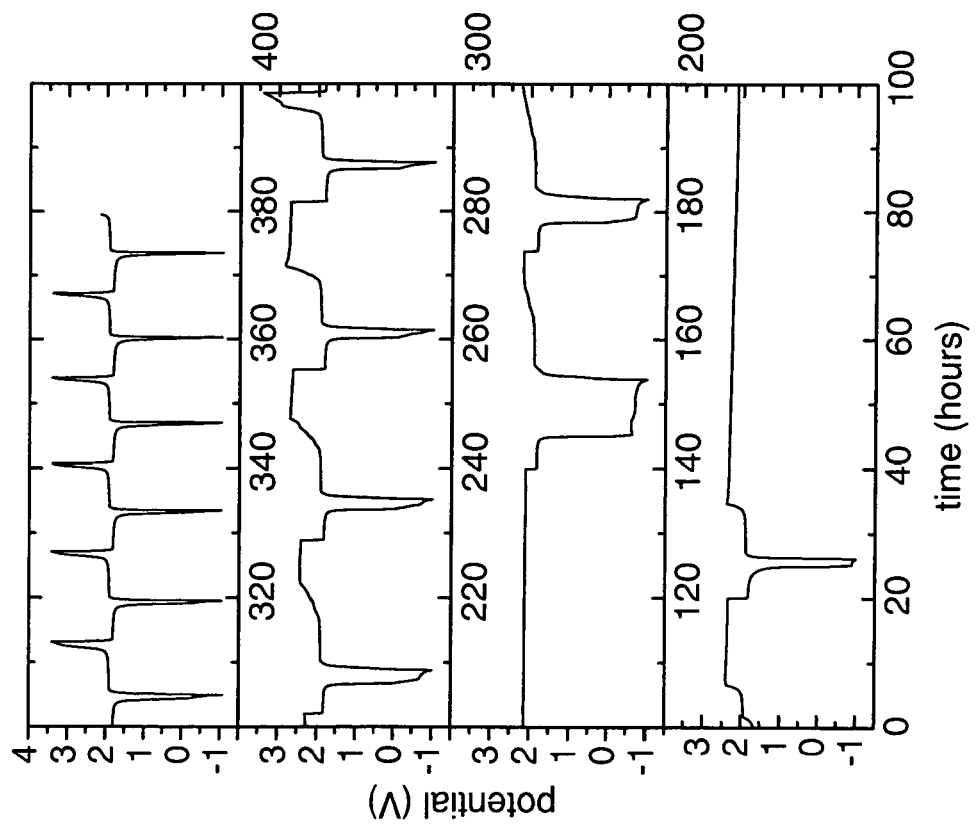
Figure 17B:
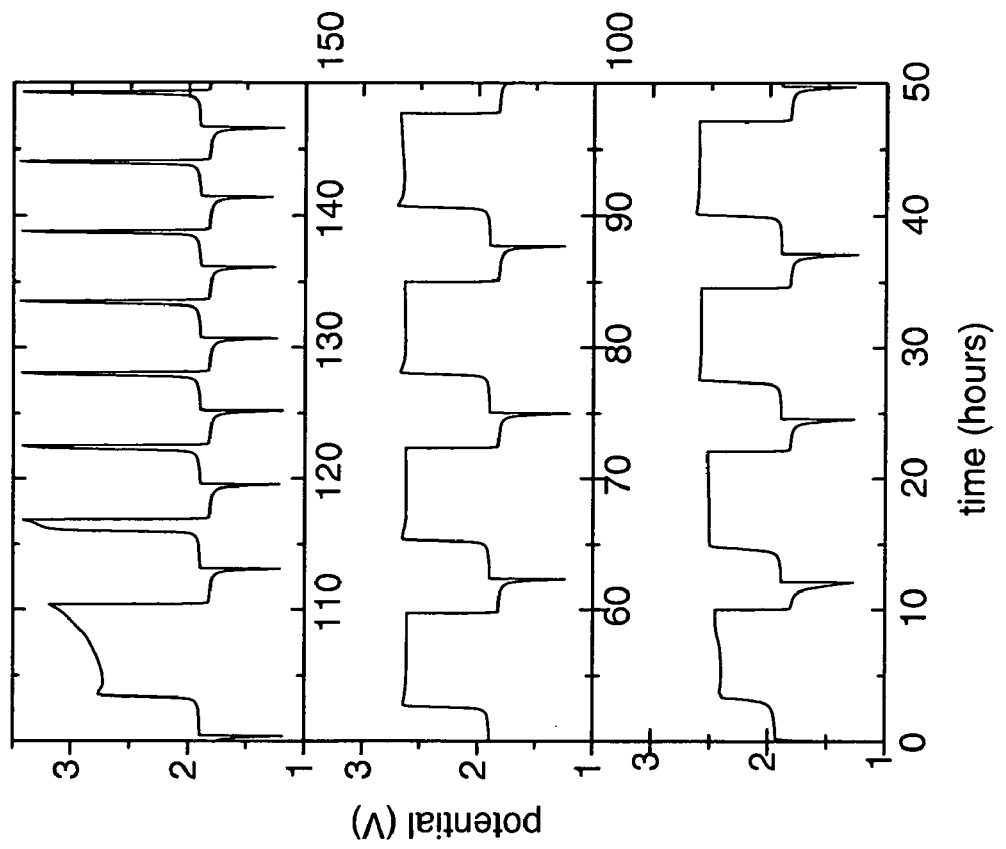
Figure 17A:
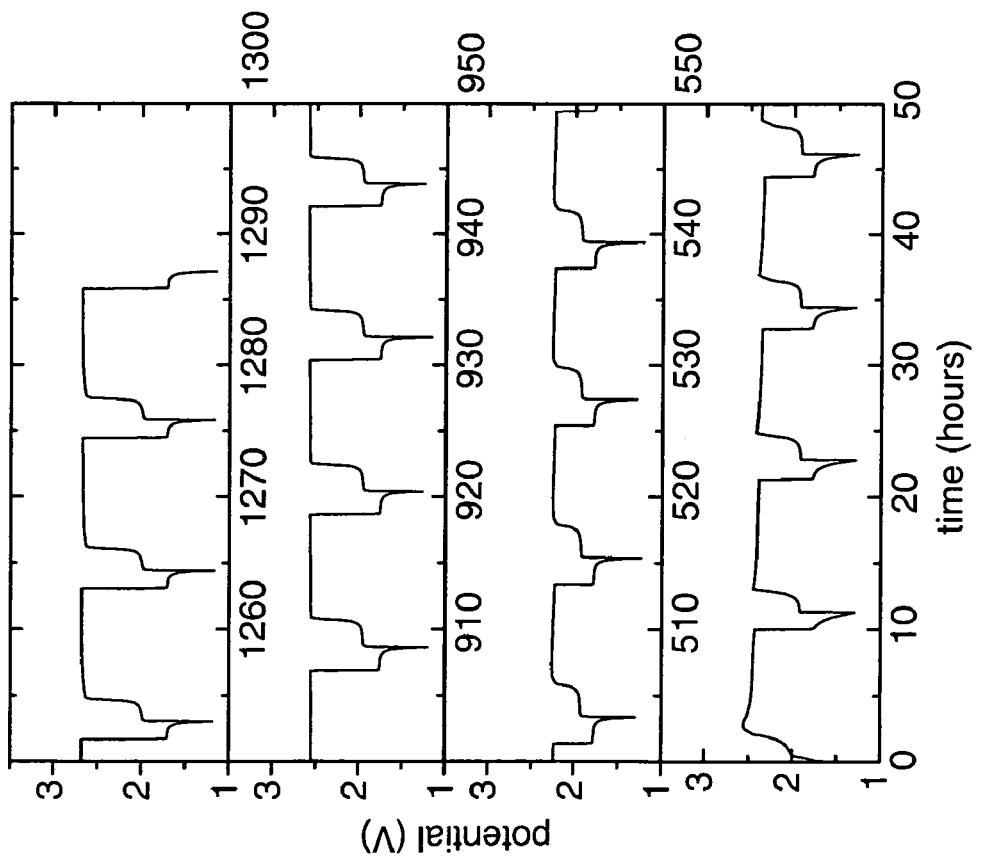
Figure 22:
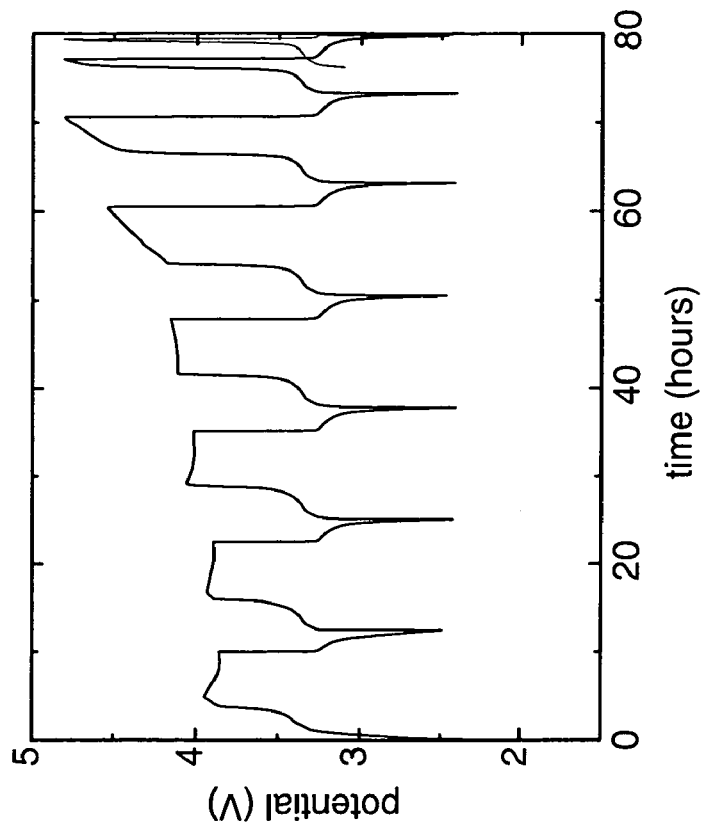
Figure 19:
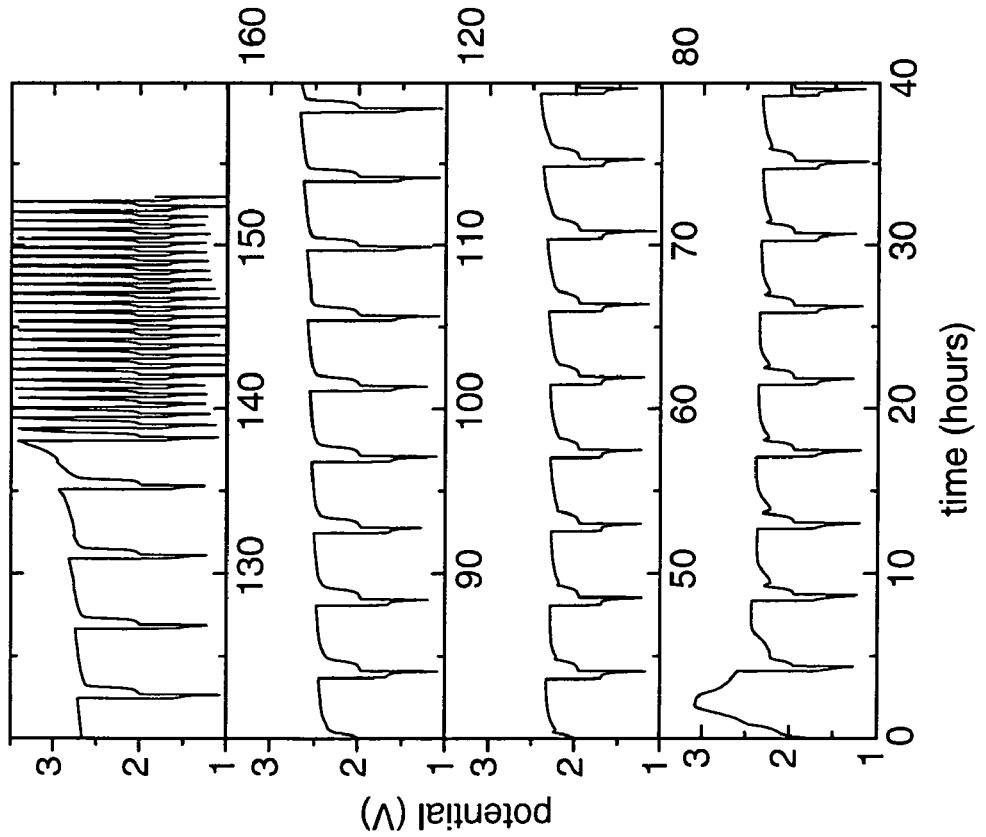
Figure 21B:
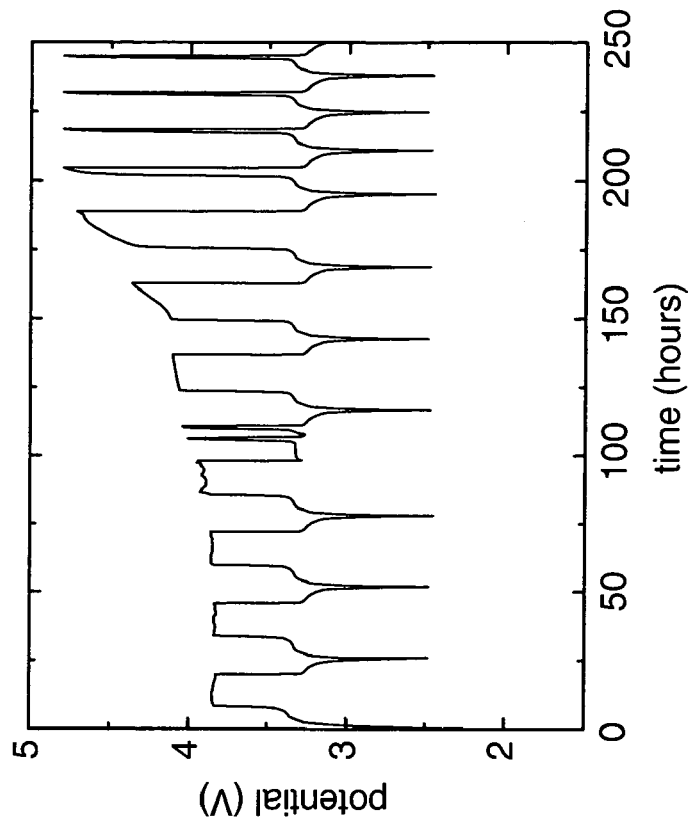
Figure 21A:
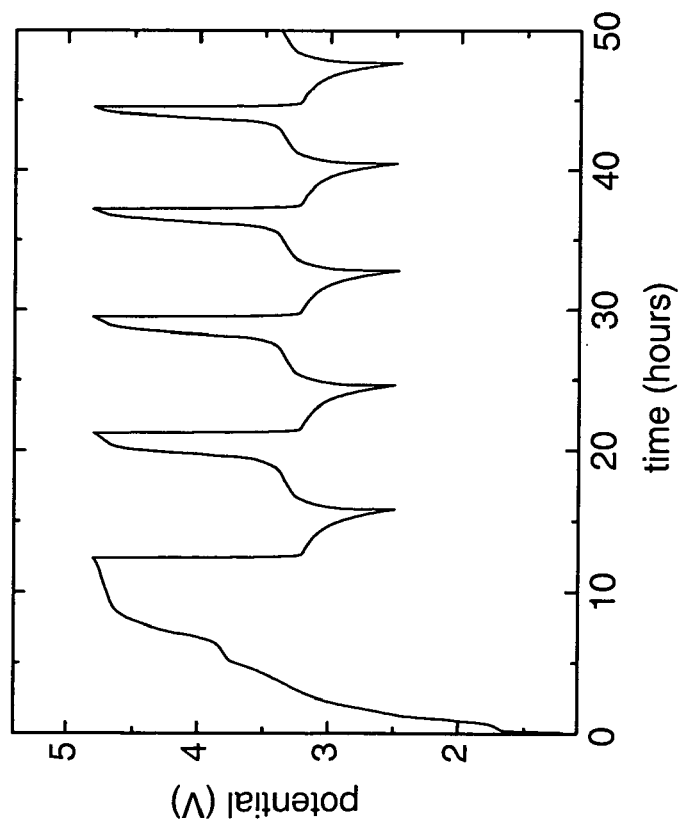
Figure 24:
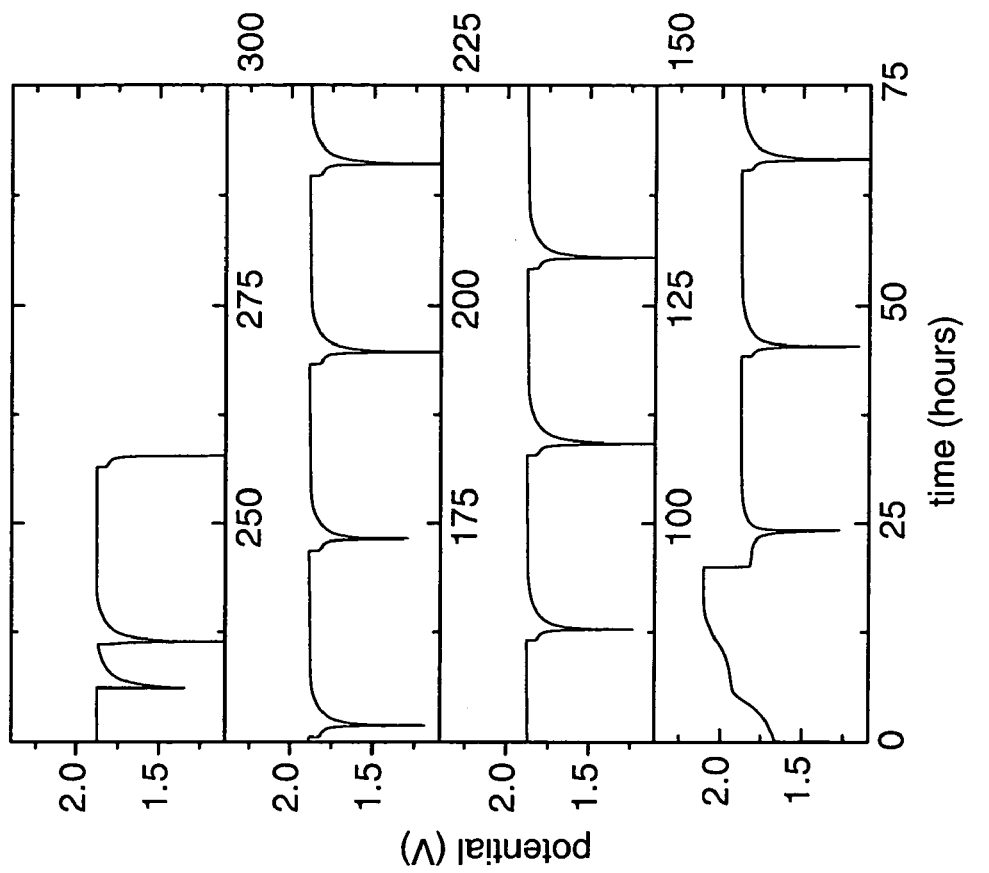
Figure 23:
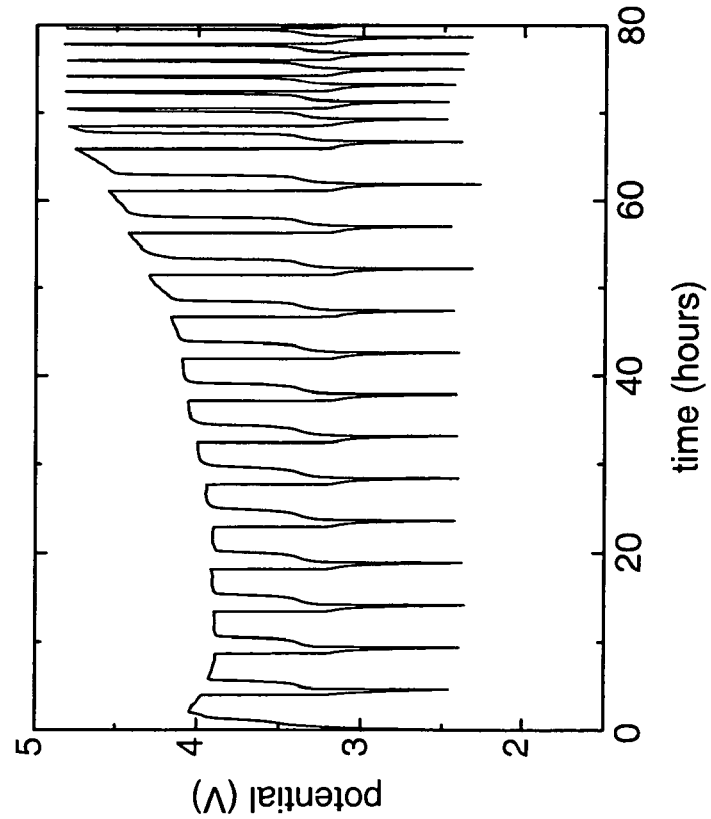
Figure 26B:
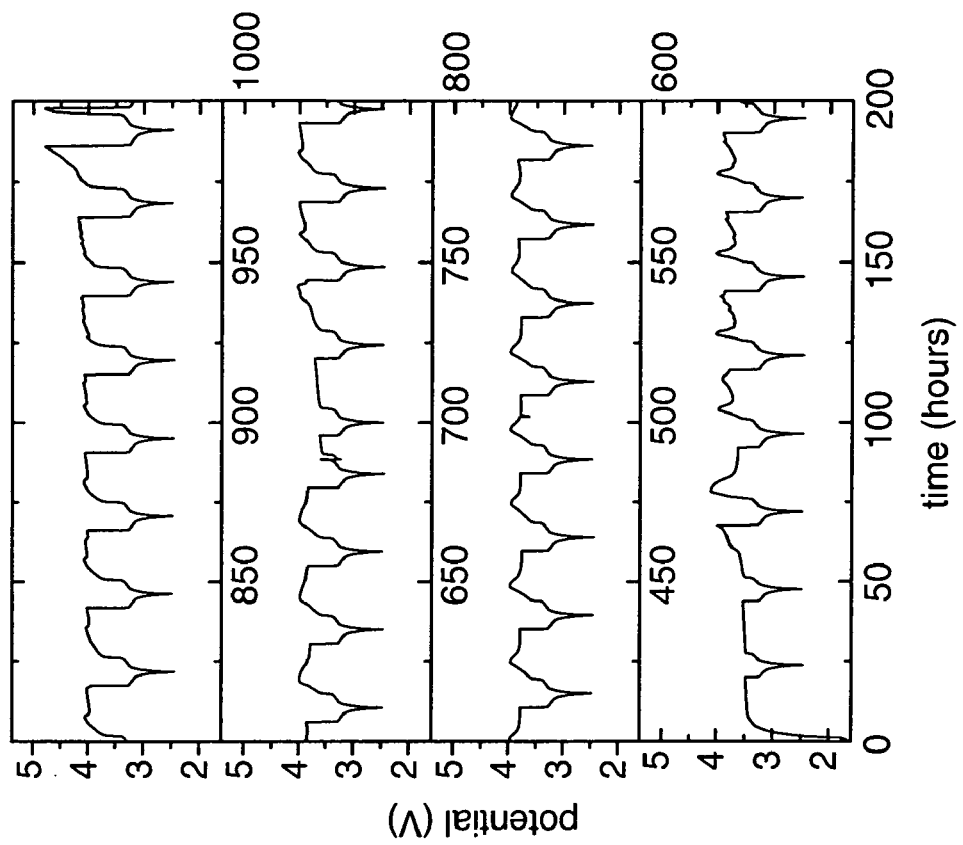
Figure 26A:
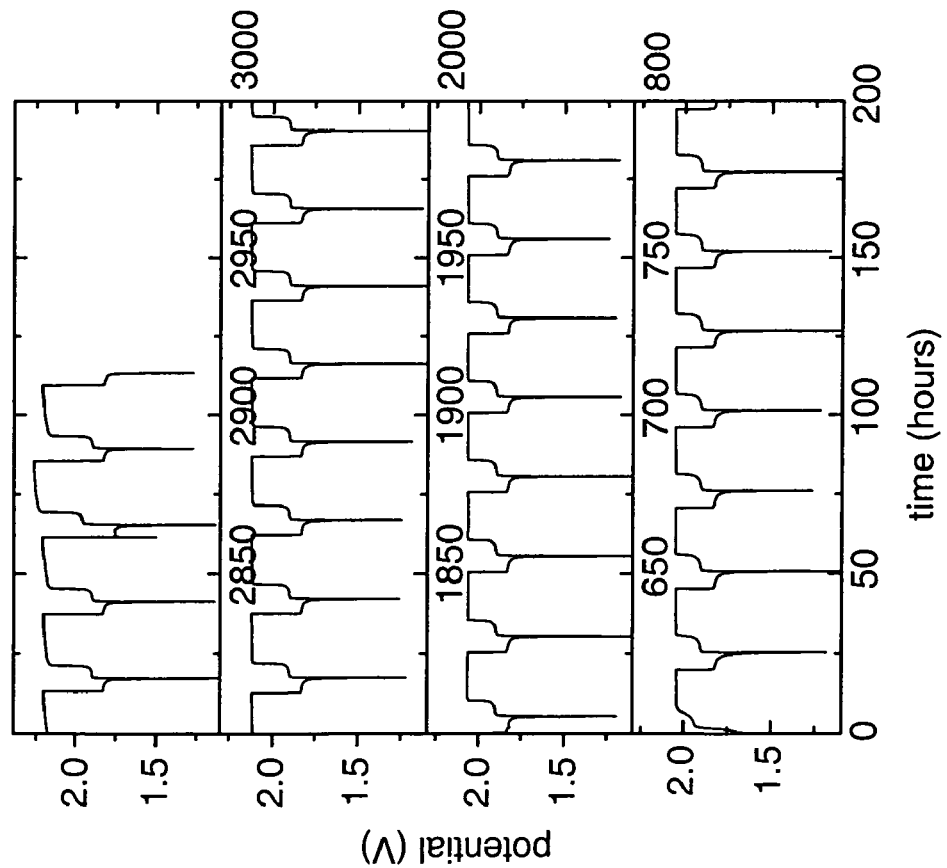

It is certified that error appears in the above-identified patent and that said Letters Patent is hereby corrected as shown below:

Delete fig. 9a and substitute therefor the drawing sheets, consisting of fig. 9a as shown on the attached page.

Column 5,
Lines 11-12, delete "'ELECTRODE MATERIAL AND COMPOSMONS'" and insert --"ELECTRODE MATERIAL AND COMPOSITIONS"-- therefor.

Signed and Sealed this
Ninth Day of August, 2011

David J. Kappos
*Director of the United States Patent and Trademark Office*